United States Patent
Sridharan et al.

(10) Patent No.: US 12,349,151 B2
(45) Date of Patent: Jul. 1, 2025

(54) RELAXING TIMELINE CONSTRAINTS ON HARQ FEEDBACK MULTIPLEXING ON PUSCH AND RELATED PROCEDURES

(71) Applicant: QUALCOMM Incorporated, San Diego, CA (US)

(72) Inventors: Gokul Sridharan, Sunnyvale, CA (US); Seyedkianoush Hosseini, San Diego, CA (US); Yi Huang, San Diego, CA (US); Wei Yang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 17/661,400

(22) Filed: Apr. 29, 2022

(65) Prior Publication Data
US 2022/0361229 A1 Nov. 10, 2022

Related U.S. Application Data

(60) Provisional application No. 63/186,758, filed on May 10, 2021.

(51) Int. Cl.
*H04W 72/23* (2023.01)
*H04L 1/1829* (2023.01)

(52) U.S. Cl.
CPC .......... *H04W 72/23* (2023.01); *H04L 1/1854* (2013.01); *H04L 1/1861* (2013.01)

(58) Field of Classification Search
CPC .... H04W 72/23; H04L 1/1854; H04L 1/1861; H04L 1/08; H04L 1/1664
See application file for complete search history.

(56) References Cited

U.S. PATENT DOCUMENTS

| | | | |
|---|---|---|---|
| 2020/0252165 A1* | 8/2020 | Nunome | H04L 5/14 |
| 2021/0051704 A1 | 2/2021 | Yang et al. | |
| 2021/0274497 A1* | 9/2021 | Fu | H04W 72/0446 |
| 2021/0337579 A1* | 10/2021 | Choi | H04L 5/0055 |
| 2021/0400652 A1* | 12/2021 | Yoshioka | H04L 1/1854 |
| 2022/0104231 A1* | 3/2022 | Gou | H04W 72/1273 |

FOREIGN PATENT DOCUMENTS

EP 3793114 A1 3/2021

OTHER PUBLICATIONS

International Search Report and Written Opinion—PCT/US2022/027317—ISA/EPO—Aug. 19, 2022.

* cited by examiner

*Primary Examiner* — Shailendra Kumar
(74) *Attorney, Agent, or Firm* — Procopio, Cory, Hargreaves & Savitch LLP/ Qualcomm

(57) ABSTRACT

A UE receives, from a base station or a component of the base station, at least one DL grant after a reception of an UL grant, the at least one DL grant being associated with a DL cDAI value and a DL tDAI value, the UL grant being associated with an UL tDAI value and scheduling a plurality of PUSCH repetitions. The UE calculates a total number of DL grants sent to the UE based on the DL cDAI value. The UE adjusts the total number of DL grants if there is a difference between the total number of DL grants and the UL tDAI value. The UE transmits, to the base station, a HARQ codebook in at least one of the plurality of PUSCH repetitions, a size of the HARQ codebook being based on the adjusted total number of DL grants.

31 Claims, 16 Drawing Sheets

RELAXING TIMELINE CONSTRAINTS ON HARQ FEEDBACK MULTIPLEXING ON PUSCH AND RELATED PROCEDURES

CROSS REFERENCE TO RELATED APPLICATION(S)

This application claims the benefit of and priority to U.S. Provisional Application Ser. No. 63/186,758, entitled "RELAXING TIMELINE CONSTRAINTS ON HARQ FEEDBACK MULTIPLEXING ON PUSCH AND RELATED PROCEDURES" and filed on May 10, 2021, which is expressly incorporated by reference herein in its entirety.

TECHNICAL FIELD

The present disclosure relates generally to communication systems, and more particularly, to wireless communication involving hybrid automatic repeat request (HARQ) feedback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives at least one downlink (DL) grant after a reception of an uplink (UL) grant, the at least one DL grant being associated with a DL current downlink assignment index (cDAI) value and a DL total downlink assignment index (tDAI) value, the UL grant being associated with an UL tDAI value and schedules a plurality of physical uplink shared channel (PUSCH) repetitions. The apparatus calculates a total number of DL grants sent to the UE based on the DL cDAI value. The apparatus adjusts the total number of DL grants if there is a difference between the total number of DL grants and the UL tDAI value. The apparatus transmits a hybrid automatic repeat request (HARQ) codebook in at least one of the plurality of PUSCH repetitions, a size of the HARQ codebook being based on the adjusted total number of DL grants.

In an aspect of the disclosure, a method, a computer-readable medium, and an apparatus are provided. The apparatus transmits at least one DL grant for a user equipment (UE) after a transmission of an UL grant, the at least one DL grant being associated with a DL cDAI value and a DL tDAI value, the UL grant being associated with an UL tDAI value and scheduling a plurality of PUSCH repetitions. The apparatus receives a HARQ codebook in at least one of the plurality of PUSCH repetitions, a size of the HARQ codebook being based at least on the UL tDAI value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
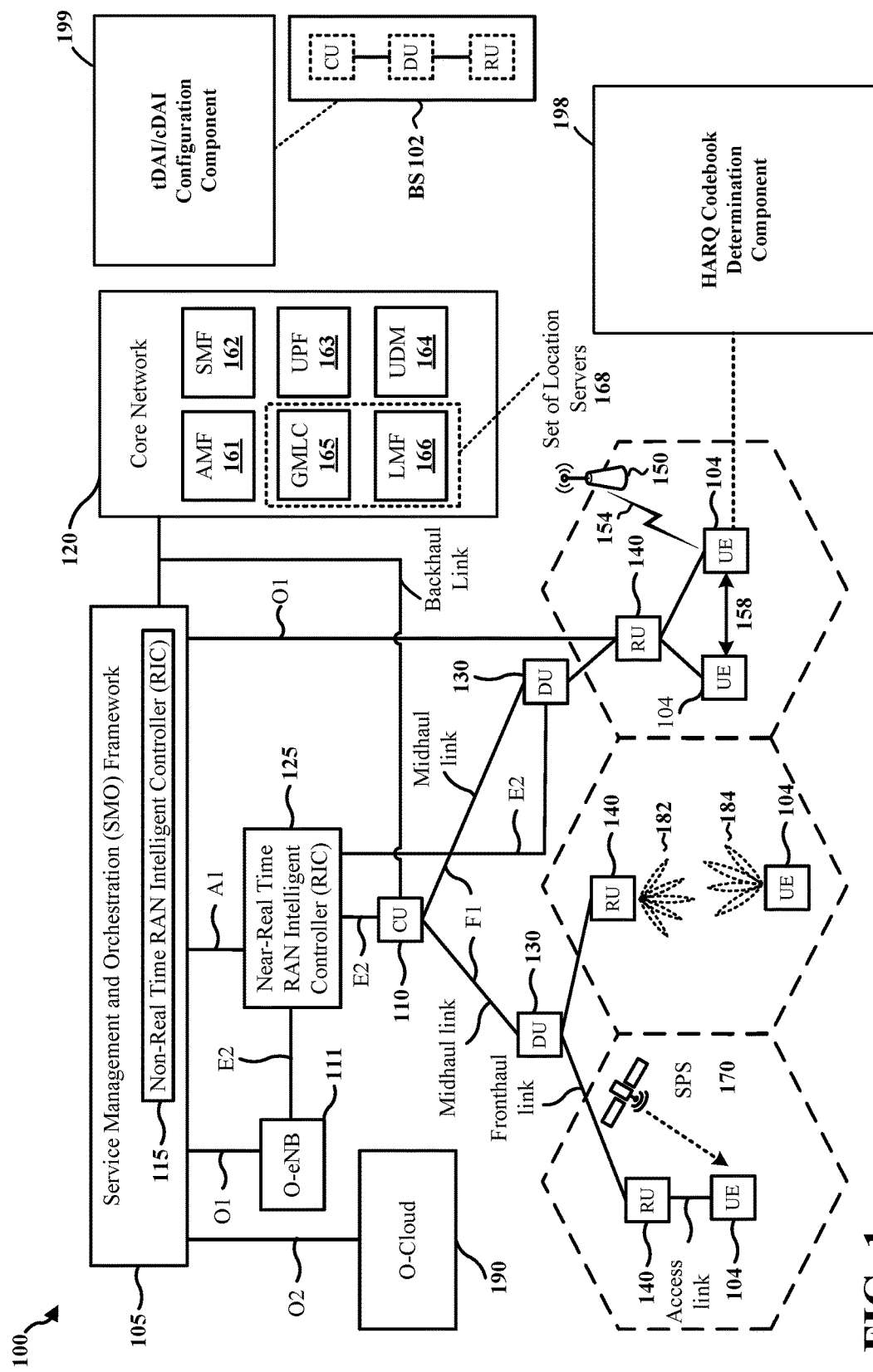
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Aspects presented herein may improve the efficiency of HARQ-feedback mechanism and the wireless resources usage by providing a more relaxing/softer timeline constraints for HARQ-ACK/NACK multiplexing on PUSCH. Aspects presented herein may enable a UE to multiplex HARQ-ACK/NACK bits of DL grants that arrive after an uplink grant (e.g., late-arriving DL grants) with one or more PUSCH repetitions, and to determine a correct HARQ codebook size for DL grants received based at least in part on cDAI/tDAI associated with the DL grants and/or the UL grant.

In certain aspects, the UE 104 may include a HARQ codebook determination component 198 configured to monitor DL grants arrived before and after an UL grant, and to perform cDAI and/or tDAI check for the DL grants to determine a correct HARQ codebook size for the DL grants. In one configuration, the HARQ codebook determination component 198 may be configured to receive, from a base station, at least one DL grant after a reception of an UL grant, the at least one DL grant being associated with a DL cDAI value and a DL tDAI value, the UL grant being associated with an UL tDAI value and scheduling a plurality of PUSCH repetitions. In such configuration, the HARQ codebook determination component 198 may calculate a total number of DL grants sent to the UE received based on the DL cDAI value. In such configuration, the HARQ codebook determination component 198 may adjust the total number of DL grants if there is a difference between the total number of DL grants and the UL tDAI value. In such configuration, the HARQ codebook determination component 198 may transmit, to the base station, a HARQ codebook in at least one of the plurality of PUSCH repetitions, a size of the HARQ codebook being based on the adjusted total number of DL grants.

In certain aspects, the base station 102 may include a tDAI/cDAI configuration component 199 configured to determine values for tDAI/cDAI that are associated with DL grants that are transmitted prior to an UL grant and DL grants that are transmitted after the UL grant. In one configuration, the tDAI/cDAI configuration component 199 may be configured to transmit, to a UE, at least one DL grant after a transmission of an UL grant, the at least one DL grant being associated with a DL cDAI value and a DL tDAI value, the UL grant being associated with an UL tDAI value and scheduling a plurality of PUSCH repetitions. In such configuration, the tDAI/cDAI configuration component 199 may receive, from the UE, a HARQ codebook in at least one of the plurality of PUSCH repetitions, a size of the HARQ codebook being based at least on the UL tDAI value.

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
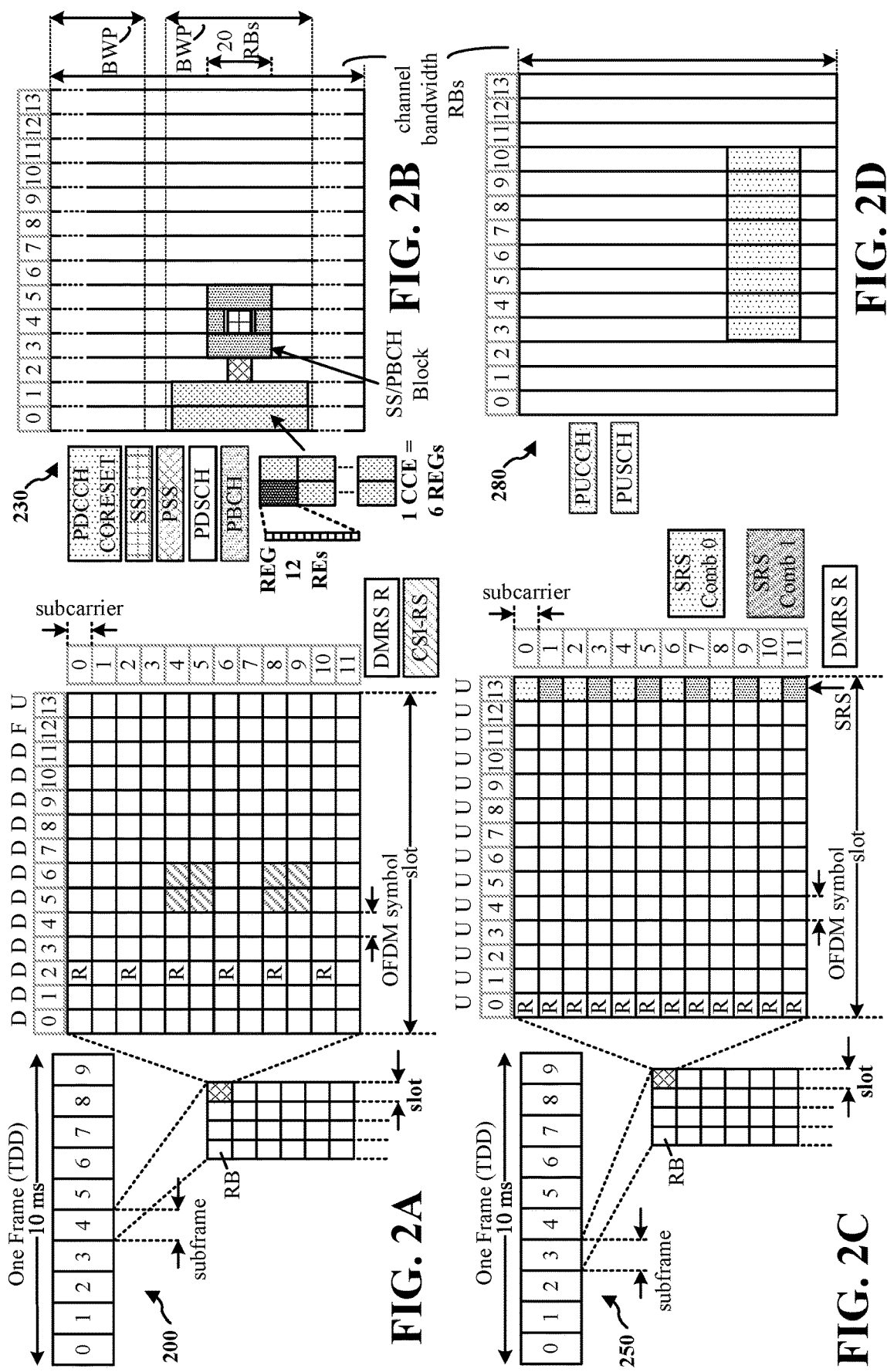
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
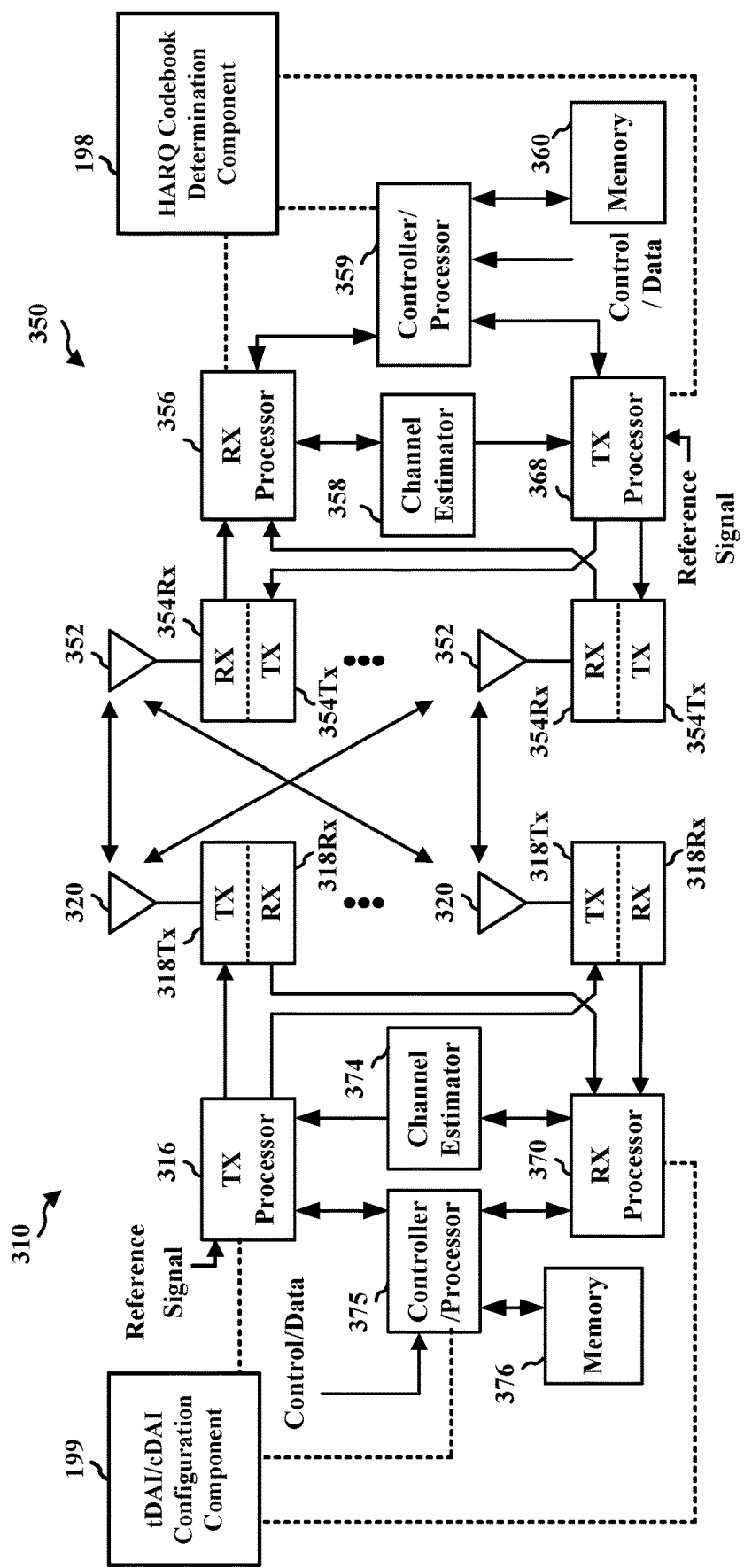
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ codebook determination component 198 of FIG. 1.

At least one of the TX processor 316, the RX processor 370, and the controller/processor 375 may be configured to perform aspects in connection with the tDAI/cDAI configuration component 199 of FIG. 1.

A base station or a component of the base station (e.g., CU/RU/DU) may configure a UE to transmit hybrid automatic repeat request (HARQ) feedback (e.g., an acknowledge (ACK) or a negative-ACK (NACK)) for one or more downlink (DL) transmissions (e.g., physical downlink shared channels (PDSCHs)). For example, a base station may schedule multiple PDSCHs to be transmitted to a UE, and the base station may request the UE to provide HARQ feedbacks for the multiple PDSCHs based on the decoding status of the multiple PDSCHs by the UE. If the UE successfully decodes a PDSCH, the UE may indicate a HARQ-ACK for that PDSCH, whereas if the UE unsuccessfully decodes a PDSCH, the UE may indicate a HARQ-NACK for that PDSCH. Then, the UE may transmit the HARQ feedbacks for the multiple PDSCHs (e.g., in a HARQ codebook) to the base station via uplink control information (UCI). The UE may multiplex the UCI with a physical uplink control channel (PUCCH), e.g., the UE may transmit the UCI as a payload via the PUCCH. If the PUCCH overlaps with a physical uplink shared channel (PUSCH), the UCI and the PUCCH may be subsumed as part of the PUSCH, e.g., the UE may transmit the UCI/PUCCH as a payload via the PUSCH.

In some examples, for a UE to transmit UCI via a PUSCH (e.g., to multiplex HARQ feedback/HARQ codebook with the PUSCH), the UE may be configured to apply or follow a set of rules/restrictions. For example, in some configurations, a UE may multiplex a HARQ-ACK/NACK bit with a PUSCH if the downlink (DL) grant corresponding to the HARQ-ACK/NACK bit (e.g., the DL grant that schedules a PDSCH to be provided with the HARQ feedback) arrives prior to an uplink (UL) grant that schedules the PUSCH (e.g., the UL grant that provides the UE with resources for the PUSCH transmission). However, the UE may not multiplex a HARQ-ACK/NACK bit with a PUSCH if the DL grant corresponding to the HARQ-ACK/NACK bit arrives after the UL grant that schedules the PUSCH. In another example, on the condition that all DL grants arrive prior to an UL grant, a UE may not expect to detect a DCI format scheduling a PDSCH reception or a semi-persistent scheduling (SPS) PDSCH release, or a DCI format 1_1 indicating secondary cell (SCell) dormancy, or a DCI format including a one-shot HARQ-ACK request field with value one (1), and indicating a resource for a PUCCH transmission with corresponding HARQ-ACK information in a slot if the UE previously detects a DCI format scheduling a PUSCH transmission in the slot and if the UE multiplexes HARQ-ACK information in the PUSCH transmission. Such configuration(s)/restriction(s) may increase the latency for HARQ-ACK/NACK multiplexing, such as when the number of PUSCH repetitions increases, and multiplexing across PUSCH repetitions may be precluded.

Figure 4:
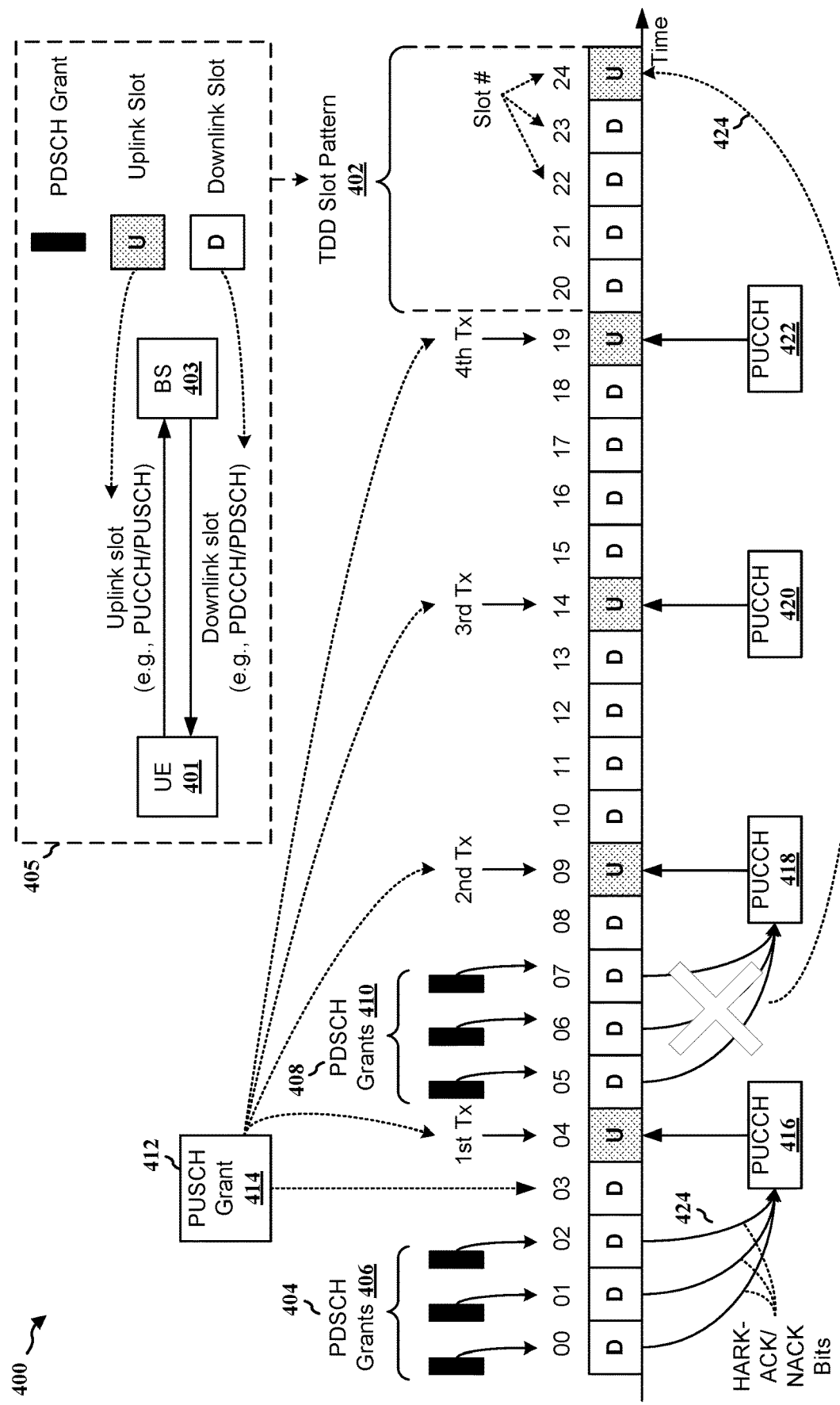
FIG. 4 is a diagram 400 illustrating an example of a UE multiplexing hybrid automatic repeat request (HARD)-acknowledgement (ACK)/negative-ACK (NACK) (HARQ-ACK/NACK) bits with a physical uplink shared channel (PUSCH) for DL grants received prior to receiving the UL grant that schedules the PUSCH (but not for DL grants received after the UL grant is received) in accordance with various aspects of the present disclosure.

FIG. 4 is a diagram 400 illustrating an example of a UE multiplexing HARQ-ACK/NACK bits with a PUSCH for DL grants received prior to receiving an UL grant that schedules the PUSCH (but not for DL grants received after the UL grant is received) in accordance with various aspects of the present disclosure. In one example, a UE 401 may be configured with a time division duplex (TDD) slot pattern 402, which may include four (4) consecutive DL slots follow by an UL slot. As shown at 405, the UE 401 may transmit a physical uplink control channel (PUCCH) and/or a physical uplink shared channel (PUSCH) to a base station 403 or a component of the base station 403 (which may be referred to as a "network node/entity" hereafter) during UL slots, and the UE 401 may receive a physical downlink control channel (PDCCH) and/or a physical downlink shared channel (PDSCH) from the base station 403 during DL slots. For example, as shown at 404 and 408, during one or more DL slots, the UE 401 may receive one or more DL grants from the base station 403 that schedule one or more PDSCHs, where the one or more DL grants may be carried in PDCCHs. Each DL grant may be associated with a downlink control information (DCI) format. For purposes of the present disclosure, a "DL grant" may also be referred to as a "PDSCH grant," and an "UL grant" may also be referred to as a "PUSCH grant."

For example, as shown at 404, the UE 401 may receive three PDSCH grants 406 from the base station 403 (e.g., at slots 00, 01, and 02), and as shown at 408, the UE 401 may receive another three PDSCH grants 410 from the base station 403 (e.g., at slots 05, 06, and 07). As shown at 412, the UE 401 may also receive a PDCCH in a DL slot (e.g., at slot 03) that carries a PUSCH grant 414 (e.g., in an uplink DCI). The PUSCH grant 414 may indicate a PUSCH transmission constituting a total of four (4) PUSCH repetitions that are scheduled to be transmitted via four UL slots (e.g., at slots 04, 09, 14, and 19), which may be associated with PUCCHs 416, 418, 420, and 422, respectively. As shown by the diagram 400, the UE 401 may receive the PDSCH grants 406 before receiving the PUSCH grant 414, and the UE 401 may receive the PDSCH grants 410 after receiving the PUSCH grant 414. For purposes of the present disclosure, a DL grant that arrives at a UE prior to an UL grant may be referred to as an "early-arriving grant," an "early-arriving DL grant," and/or an "early-arriving PDSCH grant," while a DL grant that arrives at a UE after an UL grant may be referred to as a "late-arriving grant," a "late-arriving DL grant," and/or a "late-arriving PDSCH grant." For example, as PDSCH grants 406 arrive at the UE 401 prior to the PUSCH grant 414, PDSCH grants 406 may be referred to as early-arriving grants, early-arriving DL grants, and/or early-arriving PDSCH grants. On the other hand, as PDSCH grants 410 arrive at the UE 401 after the PUSCH grant 414, PDSCH grants 410 may be referred to as late-arriving grants, late-arriving DL grants, and/or late-arriving PDSCH grants, etc.

After the UE 401 receives one or more DL grants from the base station 403, based on the detection and decoding status of the one or more DL grants (e.g., the decoding status of the PDSCHs scheduled by the DL grants), the UE 401 may provide HARQ feedback for the DL grants to the base station 403 indicating whether the DL grants (e.g., their associated PDSCHs) have been successfully or unsuccessfully decoded by the UE 401. For example, each DL grant may correspond to a HARQ-ACK bit or a HARQ-NACK bit in the HARQ feedback, and then the UE 401 may map the HARQ feedback to one or more PUCCHs scheduled by the base station in an UL grant. In some examples, the HARQ feedback may also be referred to as a HARQ codebook, a HARQ feedback codebook, and/or a HARQ-ACK/NACK codebook, etc. As such, for purposes of the present disclosure, the term "HARQ feedback" may be used interchangeably with "HARQ codebook," "HARQ feedback codebook," and/or "HARQ-ACK/NACK codebook."

In one example, if the UE 401 is configured to multiplex HARQ-ACK/NACK bits with a PUSCH or a PUSCH repetition for early-arriving DL grants but not for late-arriving DL grants, the UE 401 may multiplex HARQ-ACK/NACK bits associated with the PDSCH grants 406 with at least one of the PUCCHs 416, 418, 420, and 422. For example, as shown at 424, the UE 401 may multiplex HARQ-ACK/NACK bits associated with the PDSCH grants 406 with the PUCCH 416 as the PDSCH grants 406 are received by the UE 401 prior to receiving the PUSCH grant 414, where the PUCCH 416 may overlap with a corresponding PUSCH/PUSCH repetition (e.g., at slot 04). In other words, the HARQ-ACK/NACK bits associated with the PDSCH grants 406 may be multiplexed with at least one PUSCH/PUSCH repetition scheduled by the PUSCH grant 414. However, the UE 401 may not multiplex HARQ-ACK/NACK bits associated with the PDSCH grants 410 with PUCCHs 416, 418, 420, and/or 422 as the PDSCH grants 410 are received by the UE 401 after receiving the PUSCH grant 414. In such an example, the UE 401 may be configured to multiplex the HARQ-ACK/NACK bits associated with the PDSCH grants 410 (e.g., the late-arriving DL grants) with a PUSCH/PUSCH repetition that is not scheduled by the PUSCH grant 414. For example, as shown at 424, the UE 401 may multiplex the HARQ-ACK/NACK bits associated with the PDSCH grants 410 to a PUSCH/PUSCH repetition at slot 24 (e.g., after PUSCH repetitions scheduled by the PUSCH grant 414 are transmitted by the UE 401). In other words, the HARQ-ACK/ACK bits of the PDSCH grants 406 may be multiplexed with a PUSCH in slot 04, but the remain three HARQ-ACK/NACK bits of the PDSCH grants 410 may be deferred until the four PUSCH repetitions (e.g., at slots 04, 09, 14, and 19) are completed. As such, there may be a long latency between the reception of the PDSCH grants 410 (e.g., at slots 05, 06, and 07) and the transmission of their corresponding HARQ feedback (e.g., at slot 24). If the number of PUSCH repetitions increases (e.g., to eight repetitions, sixteen repetitions, thirty-two repetitions, etc.), the latency may further increase and cause longer delays for the HARQ feedback.

Each PDSCH grant (e.g., PDSCH grants 406, 410) transmitted to a UE from a base station or a component of the base station may include at least one of a current downlink assignment index (cDAI) parameter or a total downlink assignment index (tDAI) parameter. The value indicated by the cDAI parameter may provide a running count of the number of PDSCH grants transmitted to the UE up to that point, and the tDAI parameter may provide a total count of the number of PDSCH grants transmitted to the UE up to that point. In some examples, the tDAI parameter in a PDSCH grant may be used in the context of carrier aggregation. For example, if multiple carriers are being activated in DL and a UE is configured to receive PDSCHs via the multiple carriers, the tDAI parameter and/or the cDAI parameter in the PDSCH grants may enable the UE to determine a total number of PDSCH grants in which the UE may receive or is scheduled to receive across the multiple carriers. In some examples, if the UE is communicating with a single carrier, the DL grant may include the cDAI parameter but not the tDAI parameter.

Similarly, a PUSCH grant (e.g., the PUSCH grant 414) may also include a tDAI parameter which may enable a UE to determine a total number of PDSCH grants (e.g., transmitted by the base station) up to that point (e.g., the point in which the UE receives the PUSCH grant). Then, based on the total number of PDSCH grants determined, the UE may determine a size for a HARQ codebook that is to be transmitted to the base station carrying HARQ-ACK/NACK bits of the PDSCH grants. In other words, as each PDSCH grant may correspond to a HARQ-ACK/NACK bit, the UE may determine a HARQ codebook size that is to be sent back to the base station (e.g., to be multiplexed with a PUSCH/PUCCH) based on the total number of PDSCH grants determined/counted by the UE. As such, a base station may use the tDAI parameter in a PUSCH grant to indicate to a UE that the base station is expecting the UE to transmit a HARQ codebook (e.g., a HARQ feedback) with a HARQ codebook size corresponding to the tDAI parameter.

For example, the cDAI parameter and the tDAI parameter may each be a two-bit field (e.g., representing four values: 0, 1, 2, 3, etc.). In such an example, the value indicated by the cDAI parameter and/or the tDAI parameter may not be an absolute value for the HARQ-ACK/NACK bits (e.g., the HARQ codebook size expected by the base station), but may be a modulo of the value for the HARQ-ACK/NACK bits. In other words, the cDAI parameter and the tDAI parameter may be two-bit fields that follow a modulo logic, where a number indicating the PDSCH grants may roll over if the number exceeds four (4) (e.g., exceeding the maximum value (three) that may be represented by a two-bit field). For example, if a total number of PDSCH grants is seven (7) (e.g., the HARQ codebook size is seven), it may be indicated by a tDAI parameter or a cDAI parameter as three (3), e.g., 7 mod 4=3. Thus, if a tDAI parameter indicates a value of X (e.g., X=0, 1, 2, 3), the value may correspond to any value of X that result in X mod 4=3. For example, if a tDAI parameter indicates a value of three (3), it may correspond to three (3), seven (7), eleven (11), or fifteen (15) bits, and so on (e.g., for the actual HARQ codebook size). If a tDAI parameter indicates a value of two (2), it may correspond to two (2), six (6), ten (10), fourteen (14) bits, and so on.

In other words, when a UE is configured to multiplex the HARQ-ACK/NACK payload (e.g., the HARQ codebook) with a PUSCH/PUSCH repetition, the tDAI parameter carried in an UL grant may be used by the UE to determine a set of possible HARQ codebook sizes. For example, if tDAI=3, then the possible HARQ codebook sizes may be one of 3, 7, 11, 15, . . . bits, and so on. Then, the UE may determine/select an actual or a suitable codebook size from the set of possible HARQ codebook sizes (e.g., 3/7/11/15/ . . . bits) based on the cDAI parameter in DL/PDSCH grants. As the UE may be configured to keep track of the cDAI carried in DL grants, the cDAI parameter associated with the DL grants may be used by the UE to uniquely determine a HARQ codebook size from the set of possible HARQ codebook sizes.

For example, referring back to FIG. 4, the UE 401 may keep track of a number of PDSCH grants received based on their associated cDAI values. As an example, the three PDSCH grants 406 may include cDAI counters 0, 1, 2, and the three PDSCH grants 410 may include cDAI counters 3, 0, 1. Thus, the UE 401 may count a total of six (6) PDSCH grants. Then, the UE 401 may be configured to round the counted value to a nearest HARQ codebook size from the set of possible HARQ codebook sizes (e.g., to a nearest codebook size that is capable of carrying all the HARQ-ACK/NACK bits for PDSCH grants counted). For example, if the UE 401 counts a total of six (6) PDSCH grants (e.g., HARQ-ACK/NACK bits=6) and the possible HARQ codebook sizes are three (3), seven (7), eleven (11), fifteen (15) bits, and so on, the UE 401 may select seven bits for the HARQ codebook size (as seven bits are the closest bits that may carry the six HARQ-ACK/NACK bits). Based on the selected HARQ codebook size (e.g., seven bits), the UE 401 may transmit a HARQ feedback/codebook with the selected HARQ codebook size to the base station 403, where the UE 401 may include a padding/dummy for the additional bit. For example, as the six PDSCH grants may correspond to six HARQ-ACK/NACK bits but the HARQ codebook determined by the UE 401 is seven bits, the UE 401 may add one dummy/padding bit to the six HARQ-ACK/NACK bits.

While a HARQ codebook size expected by a base station is configured to match the HARQ codebook size determined by a UE based on the tDAI parameter in an UL grant and the cDAI parameter in one or more DL grants, an ambiguity may occur if the UE fails to receive one or more DL grants from the base station. In some examples, if the UE fails to receive few DL grants (e.g., one or two DL grants, etc.), the UE may be able to detect the missing DL grant(s) based on the cDAI parameters associated with the received DL grants. For example, if cDAI parameters of three received PDSCH grants correspond to 0, 2, and 3, the UE may determine that a PDSCH grant (e.g., the PDSCH grant with cDAI=1) may be missing in between. If cDAI parameters of two received PDSCH grants correspond to 0 and 3, the UE may determine that two PDSCH grants (e.g., PDSCH grants with cDAI=1 and cDAI=2) may be missing in between. In some examples, if the UE detects one or more missing PDSCH grants, the UE may be configured to insert padding/dummy bit(s) for the one or more PDSCH grants (e.g., for the missing cDAI), such that the UE and the base station may stay in sync (e.g., have consistent determination/calculation for the HARQ codebook size).

In some examples, a UE may not be able to detect when one or more PDSCH grants are missing. In one example, if a UE fails to receive the last DL grant that is to be mapped to a PUCCH, the UE may not be able to detect that the last DL grant is missing. For example, a base station may transmit eight (8) DL grants to a UE, where the cDAI parameters associated with the eight DL grants may correspond to: 0, 1, 2, 3, 0, 1, 2, 3. However, if the UE fails to receive the last DL grant (e.g., the DL grant with cDAI=3), the UE may determine that there are a total of seven DL grants based on the cDAI parameters associated with the first seven DL grants received (e.g., the cDAI parameters in the first seven DL grants are in a correct counting order: 0, 1, 2, 3, 0, 1, 2). As such, an ambiguity regarding the size of the HARQ codebook size may occur between the UE and the base station as the base station may expect a HARQ codebook size of eight bits and the UE may determine a HARQ codebook size of seven bits. In such an example, the UE may still be able to determine/select a correct HARQ codebook size based on the tDAI parameter in the UL grant, such as by rounding the counted PDSCH grants to a nearest codebook size selected from a set of possible codebook sizes associated with the tDAI parameter as the tDAI parameter is configured by the base station. For example, if the tDAI parameter indicates a value of zero (0), it may correspond to one of four (4), eight (8), twelve (12) bits, and so on possible HARQ codebook sizes. As the UE may round the counted value (e.g., the counted DL grants) to a nearest HARQ codebook size from the set of possible HARQ codebook sizes (e.g., eight bits), the HARQ codebook size expected by the base station and determined by the UE may still match after the UE rounds the counted value.

However, in some examples, if a UE misses more than four consecutive DL grants, the UE may not be able to detect and correct the missing DL grants. For example, a base station may transmit eight (8) DL grants to a UE, where the cDAI parameters associated with the eight DL grants may correspond to: 0, 1, 2, 3, 0, 1, 2, 3. However, if the UE fails to receive the last four DL grants, the UE may determine that there are a total of four DL grants based on the cDAI parameters associated the first four DL grants received (e.g., 0, 1, 2, 3). In such an example, the UE may not be able to determine a correct codebook size based on the tDAI parameter in the UL grant. For example, if the tDAI parameter indicates a value of zero (0) that corresponds to one of four (4), eight (8), twelve (12) bits, and so on, the UE may determine that the codebook size is four bits instead of eight bits. The UE may be configured not use the tDAI parameter in DL grants in this context as the tDAI parameter in the UL grant may take precedence. For example, referring back to FIG. 4, the tDAI parameter in the PUSCH grant 414 may include more updated information than the tDAI parameter in the last DL grant of the PDSCH grants 406 as the PDSCH grants 406 are received prior to the PUSCH grant 414. Thus, the UE 401 may be configured not to rely on the tDAI parameter in DL grants in determining a number of DL grants received and/or the HARQ codebook size.

In some examples, the tDAI parameter carried by an UL grant may apply to all repetitions scheduled by the UL grant. For example, if the PUSCH transmission over the multiple slots is scheduled by a DCI format that includes a DAI field, the value of the DAI field may be applicable for multiplexing HARQ-ACK information in the PUSCH transmission in any slot from the multiple slots where the UE multiplexes HARQ-ACK information.

Figure 5:
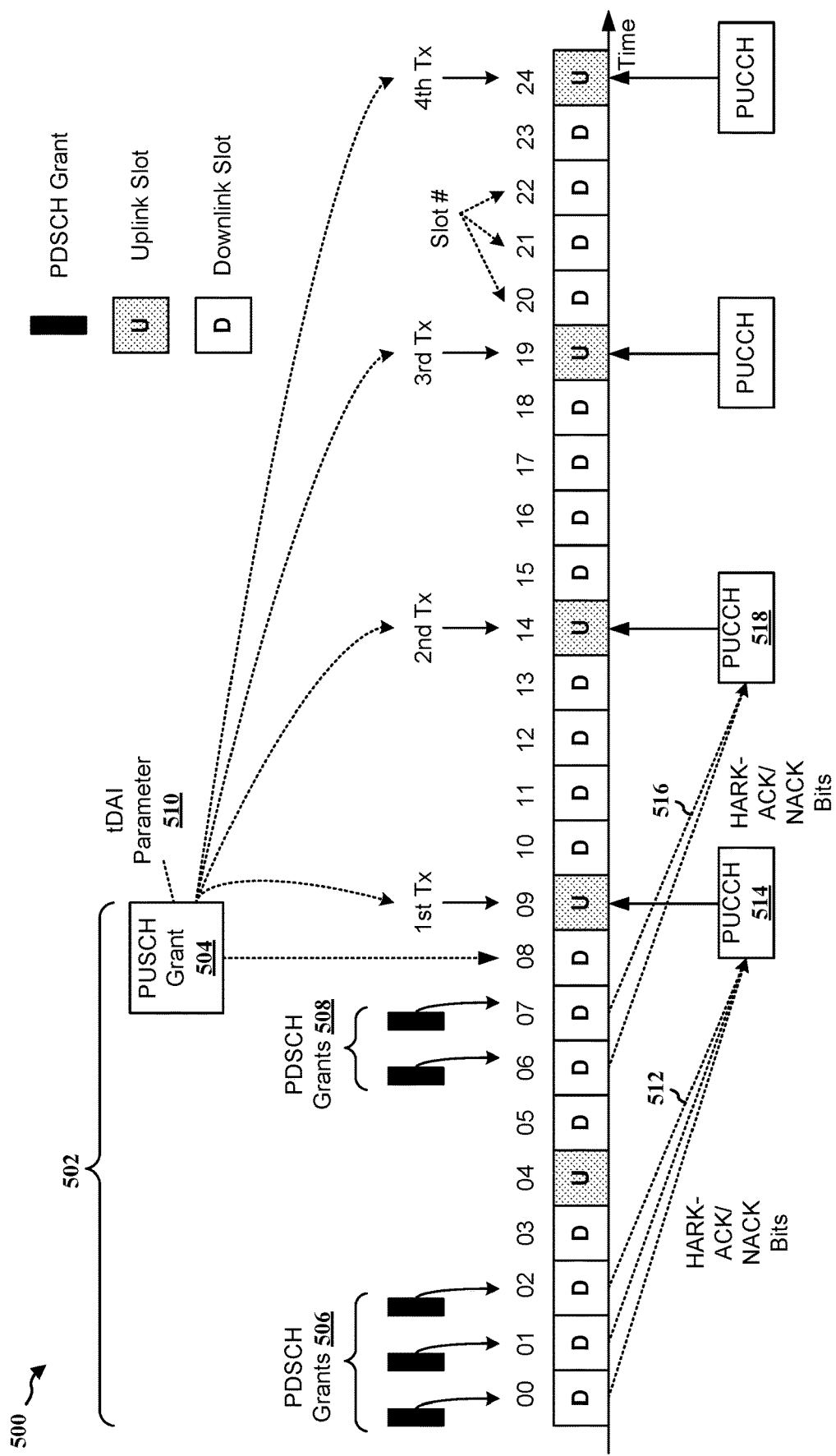
FIG. 5 is a diagram illustrating an example of a UE that is configured to apply a total downlink assignment index (tDAI) parameter carried by an UL grant to all repetitions scheduled by the UL grant in accordance with various aspects of the present disclosure.

FIG. 5 is a diagram 500 illustrating an example of a UE that is configured to apply a tDAI parameter carried by an UL grant to all repetitions scheduled by the UL grant in accordance with various aspects of the present disclosure. As shown at 502, a UE may receive a total of five (5) PDSCH grants prior to receiving a PUSCH grant 504, where three PDSCH grants 506 may be received at slots 00, 01, and 02, and two PDSCH grants 508 may be received at slots 06 and 07. The PUSCH grant 504 may indicate a PUSCH transmission constituting a total of four (4) PUSCH repetitions that are scheduled to be transmitted at slots 09, 14, 19, and 24, and the PUSCH grant 504 may also include a tDAI parameter 510 that is to be applied to the four repetitions. In one example, if the tDAI parameter 510 is configured to be three (3) (e.g., tDAI=3), the UE may transmit three HARQ-ACK/NACK bits in each of the UL slots. For example, as shown at 512, the UE may multiplex three HARQ-ACK/NACK bits for the PDSCH grants 506 with a PUCCH 514 that is to be transmitted at slot 09 (e.g., with a PUSCH repetition). Similarly, as shown at 516, the UE may multiplex the HARQ-ACK/NACK bits for the PDSCH grants 508 with a PUCCH 518 that is to be transmitted at slot 14. However, while the HARQ-ACK/NACK bits for the PDSCH grants 508 may be two (2) bits as there are two PDSCH grants, the UE may be configured to pad an additional dummy bit to the two HARQ-ACK/NACK bits (e.g., now three HARQ-ACK/NACK bits in total) so that the size of the HARQ-ACK/NACK matches the value indicated by the tDAI parameter 510 (e.g., three). In other words, even though two actual DL grants have been received by the UE, uplink tDAI indicates three, so the UE may be configured to determine the HARQ codebook size to be three (3) bits and pad an additional dummy bit. As such, if the tDAI parameter 510 is configured to apply to all repetitions scheduled by the PUSCH grant 504, it may sometimes cause an inefficient use of wireless resources when actual PDSCH grants received by the UE is less than the value indicated by the tDAI parameter 510.

Aspects presented herein may improve the efficiency of HARQ-feedback mechanism and the wireless resources usage by providing a more relaxing/softer timeline constraints for HARQ-ACK/NACK multiplexing on PUSCH. For example, a UE may be configured to multiplex HARQ-ACK/NACK bits of DL grants that arrive after an uplink grant with PUSCH repetitions while keeping a track of tDAI.

Figure 6:
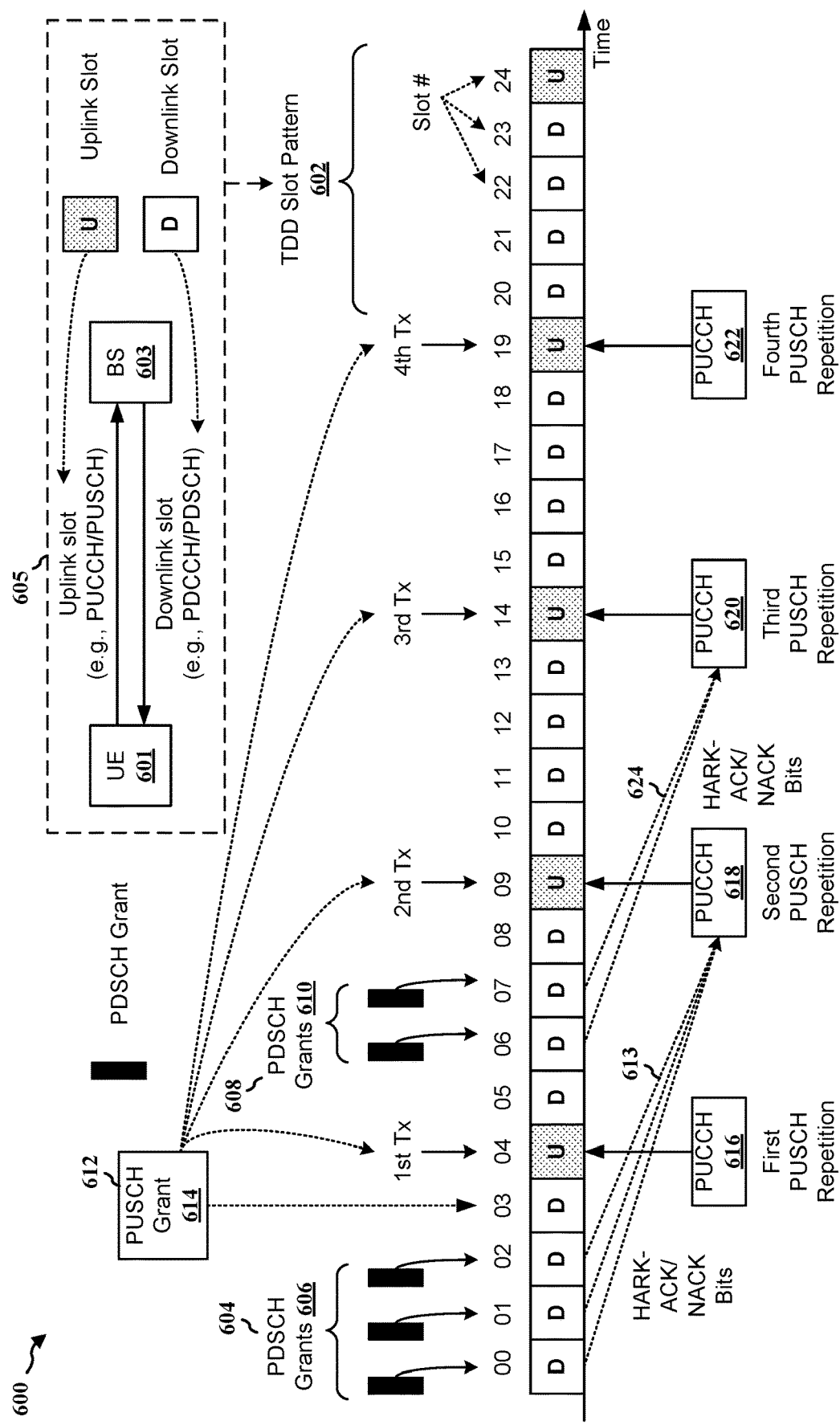
FIG. 6 is a diagram illustrating an example of a UE multiplexing HARQ-ACK/NACK bits of late-arriving DL grants (e.g., DL grants that arrive after an uplink grant) with at least one PUSCH repetition in accordance with various aspects of the present disclosure.

FIG. 6 is a diagram 600 illustrating an example of a UE multiplexing HARQ-ACK/NACK bits of late-arriving DL grants (e.g., DL grants that arrive after an uplink grant) with at least one PUSCH repetition in accordance with various aspects of the present disclosure. In one example, a UE 601 may be configured with a TDD slot pattern 602, which may include four (4) consecutive DL slots follow by an UL slot. As shown at 605, the UE 601 may transmit PUCCH and/or PUSCH to a base station 603 (or a component of the base station 603 or a network node/entity) during UL slots, and the UE 601 may receive PDCCH and/or PDSCH from the base station 603 during DL slots.

As shown at 604 and 608, during DL slots, the UE 601 may receive one or more DL grants from a base station 603, where the one or more DL grants may be carried in PDCCHs and each DL grant may be associated with a DCI format. For example, at 604, the UE 601 may receive three PDSCH grants 606 from the base station 603, and at 608, the UE 601 may receive two PDSCH grants 610 from the base station 603. At 612, the UE 601 may receive a PDCCH in a DL slot (e.g., at the slot 03) that includes a PUSCH grant 614. The PUSCH grant 614 may indicate a PUSCH transmission constituting a total of four (4) PUSCH repetitions that are scheduled to be transmitted at slots 04, 09, 14, and 19, which may be associated with PUCCHs 616, 618, 620, and 622, respectively. The PUCCHs 616, 618, 620, and 622 may also correspond to or overlap with a first PUSCH repetition, a second PUSCH repetition, a third PUSCH repetition, and a fourth PUSCH repetition, respectively. As shown by the diagram 600, the UE 601 may receive the PUSCH grant 614 after receiving the PDSCH grants 606, but prior to receiving the PDSCH grants 610. As such, the PDSCH grants 606 may be early-arriving DL grants, while the PDSCH grants 610 may be late-arriving DL grants. Based on the detection and decoding of the PDSCH grants, the UE 601 may provide HARQ feedback for the corresponding PDSCH grants, such as described in connection with FIG. 4.

In one aspect of the present disclosure, for the first PUSCH repetition scheduled by the PUSCH grant 614 (e.g., the first PUSCH repetition that is to be transmitted at slot 04), the UE 601 may be configured to multiplex HARQ-ACK/NACK bits of early-arriving DL grants with the first PUSCH but not for late-arriving DL grants, such as described in connection with FIG. 4. For example, at slot 04, the UE 601 may multiplex the HARQ-ACK/NACK bits of the PDSCH grants 606 with the first PUSCH repetition that is associated with the PUCCH 616 as the PDSCH grants 606 are received prior to the PUSCH grant 614. However, the UE 601 may not multiplex HARQ-ACK/NACK bits of the PDSCH grants with a first PUSCH repetition if they are received after the PUSCH grant 614. For example, if the UE 601 receives a PUSCH grant 614 at slot 02 and receives three PDSCH grants at slots 00, 01, and 03, the UE 601 may multiplex HARQ-ACK/NACK bits of the PDSCH grants received at slots 00 and 01 with the first PUSCH repetition, but the UE 601 may not multiplex the HARQ-ACK/NACK bit of the PDSCH grant received at slot 03 with the first PUSCH repetition.

Then, for the second and subsequent PUSCH repetitions, such as the second, the third, and the fourth PUSCH repetitions associated with the PUCCHs 618, 620, and 622, the UE 601 may be configured to multiplex HARQ-ACK/NACK bits of early-arriving DL grants (e.g., DL grants received prior to the UL grant) and/or late-arriving DL grants (e.g., DL grants received after the UL grant) to at least one of the second and subsequent PUSCH/PUSCH repetitions. For example, as shown at 624, the UE 601 may multiplex HARQ-ACK/NACK bits of PDSCH grants 610 that are received after the PUSCH grant 614 with the second PUSCH repetition at slot 9, with the third PUSCH repetition at slot 14, and/or with the fourth PUSCH repetition at slot 19, etc. Similarly, as shown at 613, the UE 601 may also multiplex HARQ-ACK/NACK bits of early-arriving DL grants with at least one of the second and subsequent PUSCH repetitions as well. For example, the UE 601 may multiplex HARQ-ACK/NACK bits of the PDSCH grants 606 with the second PUSCH repetition at slot 09.

Figure 7:
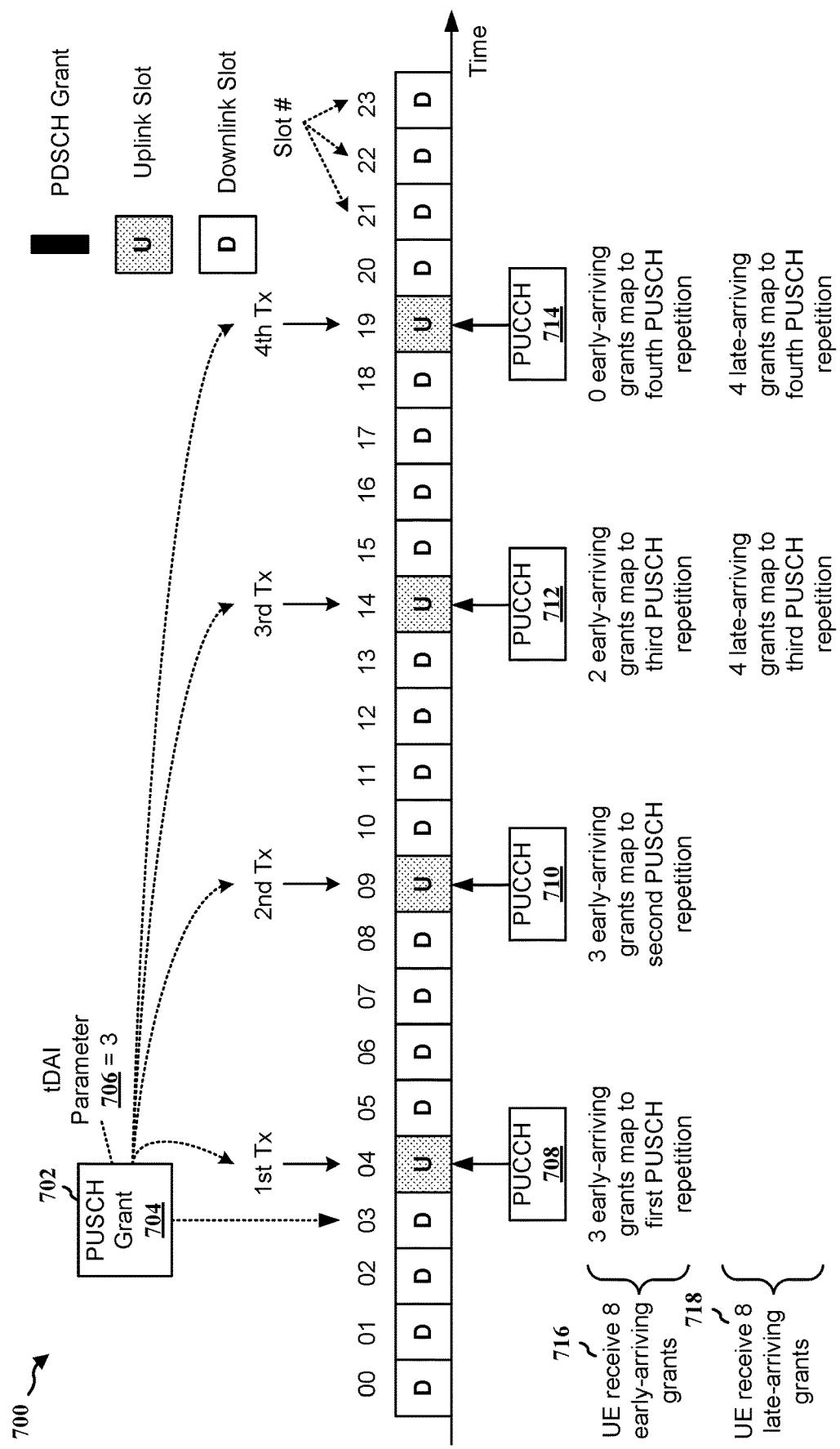
FIG. 7 is a diagram illustrating an example of multiplexing late-arriving DL grants with at least one of the second and subsequent PUSCH repetitions in accordance with various aspects of the present disclosure.

FIG. 7 is a diagram 700 illustrating an example of multiplexing late-arriving DL grants with at least one of the second and subsequent PUSCH repetitions in accordance with various aspects of the present disclosure. As shown at 702, a UE may receive a PDCCH in a DL slot (e.g., at slot 03) that carries a PUSCH grant 704, where the PUSCH grant 704 may include a tDAI parameter 706 that indicates a value of three (e.g., tDAI=3). The PUSCH grant 704 may indicate a PUSCH transmission constituting a total of four (4) PUSCH repetitions that are scheduled to be transmitted at slots 04, 09, 14, and 19, which may be associated with PUCCHs 708, 710, 712, and 714, respectively. The PUCCHs 708, 710, 712, and 714 may also correspond to or overlap with a first PUSCH repetition, a second PUSCH repetition, a third PUSCH repetition, and a fourth PUSCH repetition, respectively.

In one example, as shown at 716, the UE may receive eight (8) early-arriving DL grants, where the UE may map HARQ-ACK/NACK bits of the eight early-arriving DL grants as 3-3-2-0 across the four PUSCH repetitions. For example, the UE may map HARQ-ACK/NACK bits of the first three (of the eight) early-arriving DL grants to the PUCCH 708 that overlaps with the first PUSCH repetition, the UE may map HARQ-ACK/NACK bits of the next three early-arriving DL grants to the PUCCH 710 that overlaps with the second PUSCH repetition, and the UE may map HARQ-ACK/NACK bits of the last two early-arriving DL grants to the PUCCH 712 that overlaps with the third PUSCH repetition, etc. As the tDAI parameter 706 may be a two bits field, when the tDAI parameter 706 equals to three (tDAI=3), the tDAI parameter 706 may correspond to a HARQ codebook size of three, seven, eleven, or fifteen bits, and so on.

Then, as shown at 718, the UE may receive eight (8) late-arriving DL grants. As the UE may be configured to not map HARQ-ACK/NACK bits of the late-arriving DL grants on the first PUSCH repetition and to map the HARQ-ACK/NACK bits of the late-arriving DL grants to at least one of the second and subsequent PUSCH repetitions, in one example, the UE may map HARQ-ACK/NACK bits of the eight late-arriving DL grants as 0-0-4-4 across the four PUSCH repetitions. For example, the UE may map HARQ-ACK/NACK bits of the first four late-arriving DL grants to the PUCCH 712 that overlaps with the third PUSCH repetition, and the UE may map HARQ-ACK/NACK bits of the next (or last) four late-arriving DL grants to the PUCCH 714 that overlaps with the fourth PUSCH repetition, etc.

In some examples, the UE may be configured to transmit HARQ-ACK/NACK bits to the base station in an order that corresponds to the order in which the DL grants are received. For example, if the UE receives a first DL grant at slot 00, a second DL grant at slot 01, and a third DL grant at slot 02, the UE may transmit the HARQ-ACK/NACK bits for the first DL grant, the second DL grant, and the third DL grant based on the same order. Under such configuration, one PUSCH repetition (e.g., the third PUSCH) may include HARQ-ACK/NACK bits for both early-arriving DL grants and late-arriving DL grants, while the other PUSCH repetitions (e.g., the first, second, or the third PUSCH repetitions) may include HARQ-ACK/NACK bits for one of early-arriving DL grants or late-arriving DL grants but not both. For example, based on such configuration, the UE may start transmitting/mapping the HARQ-ACK/NACK bits of the late-arriving DL grants after the HARQ-ACK/NACK bits of all early-arriving DL grants have been transmitted/mapped as the UE receives early-arriving DL grants before the late-arriving DL grants. Thus, there may be one PUCCH/PUSCH repetition that carries HARQ-ACK/NACK bits for both early-arriving DL grants and late-arriving DL grants.

In another aspect of the present disclosure, if a UE is configured with the capabilities to multiplex late-arriving DL grants with at least one of the second and subsequent PUSCH repetitions, a UE may also be configured to interpret cDAI and tDAI parameters in various ways depending on the settings. For example, aspects presented herein may provide the UE with multiple options/configurations for interpreting uplink tDAI. Aspects presented herein may also provide the UE with additional procedure(s) for handling the time sequence of cDAI and tDAI, etc.

Figure 8:
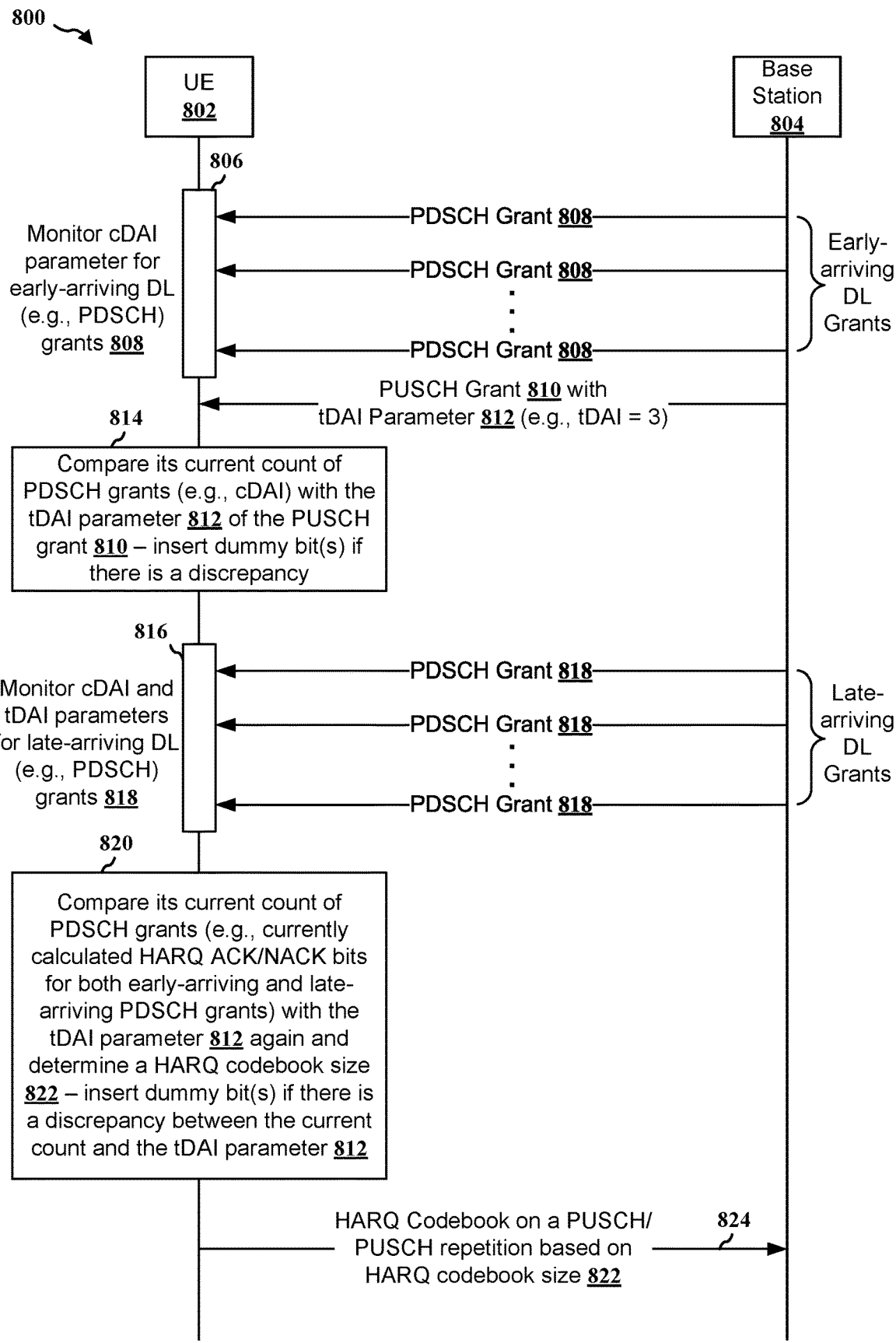
FIG. 8 is a communication flow illustrating an example of a UE monitoring and tracking one or more incoming DL grants based on current downlink assignment index (cDAI) parameter and/or tDAI parameter of UL/DL grant(s) when the UE is configured to multiplex one or more late-arriving DL grants with at least one of PUSCH repetitions in accordance with various aspects of the present disclosure.

FIG. 8 is a communication flow 800 illustrating an example of a UE monitoring and tracking one or more incoming DL grants based on cDAI parameter and/or tDAI parameter of UL/DL grant(s) when the UE is configured to multiplex one or more late-arriving DL grants with at least one of PUSCH repetitions in accordance with various aspects of the present disclosure.

In one aspect, at 806, a UE 802 may be configured to monitor cDAI parameter for one or more PDSCH grants 808 transmitted from a base station 804 or a component of the base station 804 (e.g., PDSCH grants sent to the UE 802) that arrive prior to a PUSCH grant 810 (e.g., the one or more PDSCH grants 808 are early-arriving DL grants). For example, referring back to FIG. 7, at slot 14, the UE may be configured to monitor cDAI for all DL grants that arrive prior to the PUSCH grant 704 (e.g., eight early-arriving DL grants in total). If the UE successfully receives and decodes the eight early-arriving DL grants at 716, based on the cDAI associated with the early-arriving DL grants (e.g., PDSCH grants 808) the UE may know that currently two HARQ-ACK-NACK bits of two early-arriving DL grants are to be multiplexed with the third PUSCH repetition at slot 14, e.g., cDAI=2.

At 814, the UE 802 may compare its current count of PDSCH grants (e.g., corresponding to the HARQ-ACK/NACK bits to be multiplexed with the third PUSCH repetition) with the value indicated by the tDAI parameter 812 in the PUSCH grant 810, and the UE 802 may insert one or more dummy bits to the HARQ-ACK/NACK bits if there is a discrepancy. For example, referring back to FIG. 7, if the UE knows that two HARQ-ACK-NACK bits of two early-arriving DL grants are to be multiplexed with the third PUSCH repetition at slot 14 (e.g., cDAI=2) but the tDAI parameter 706 indicates a value of three (tDAI=3), the UE may reconcile the difference by adding one dummy bit to the two HARQ-ACK/NACK bits, such that the cDAI becomes three (3) and matches the tDAI.

At 816, the UE 802 may monitor one or more PDSCH grants 818 (e.g., late-arriving PDSCH grants) based on cDAI and tDAI parameters in the one or more PDSCH grants 818 (e.g., late-arriving PDSCH grants) and determine if any HARQ-ACK/NACK bits for the one or more PDSCH grants 818 (e.g., late-arriving PDSCH grants) are to be multiplexed (e.g., to the third PUSCH repetition). For example, referring back to FIG. 7, if the UE successfully receives the eight (8) late-arriving DL grants at 718, the UE may detect/determine that four HARQ-ACK/NACK bits of four (4) late-arriving DL grants are to be multiplexed with the third PUSCH repetition at slot 14.

At 820, the UE 802 may compare its current count of PDSCH grants (e.g., currently calculated/accumulated HARQ-ACK/NACK bits for early-arriving PDSCH grants, for dummy bit(s) added at 814, and for late-arriving PDSCH grants) with the tDAI parameter 812 again and determine a HARQ codebook size 822 for a HARQ codebook that is to be transmitted to the base station 804 carrying the HARQ-ACK/NACK bits of the early-arriving PDSCH grants and late-arriving PDSCH grants. Similarly, at 820, the UE 802 may insert dummy bit(s) to the current count of PDSCH grants if there is a discrepancy between the current count and the tDAI parameter. For example, referring back to FIG. 7, the UE may calculate that the HARQ-ACK/NACK bits to be multiplexed with the third PUSCH repetition is seven (7), e.g., three (3) HARQ-ACK/NACK bits are associated with early-arriving DL grants (including one dummy bit) and four HARQ-ACK/NACK bits are associated with late-arriving DL grants, etc. Then, the UE may compare the calculated HARQ-ACK/NACK bits with the uplink tDAI. As the tDAI=3 may correspond to a codebook size of 3, 7, 11, 14 bits, and so on, the UE may determine/select 7 bits as the final codebook size. In other words, no dummy bit is added here as the calculated HARQ-ACK/NACK bits (e.g., 7 bits) matches one of the HARQ codebook sizes associated with the tDAI parameter 706.

At 824, the UE 802 may multiplex the HARQ-ACK/NACK bits of one or more PDSCH grants 818 (e.g., early-arriving PDSCH grants) and/or one or more late-arriving PDSCH grants with a PUSCH/PUSCH repetition, where the size of the HARQ-ACK/NACK bits may be based on the determined HARQ codebook size 822, and the UE may transmit the PUSCH/PUSCH repetition to the base station 804. For example, referring back to FIG. 7, as the UE determines that the final codebook size is seven bits, the UE may multiplex seven HARQ-ACK/NACK bits with the third PUSCH repetition at slot 14, and the UE may transmit the third PUSCH to the base station.

As such, aspects presented herein may enable the UE 802 to perform cDAI and tDAI check (e.g., at 824) between early-arriving DL grants and late-arriving DL grants to reconcile their values if there is a discrepancy, thereby enabling the UE 802 to multiplex HARQ-ACK/NACK bits of late-arriving DL grants with one or more PUSCH repetitions while maintaining an accurate count of DL grants. In other words, aspects presented herein may enable the UE 802 to determining whether there is a difference between a total number of DL grants sent to the UE and the UL tDAI value of the UL grant, and may enable the UE 802 to adjust the total number of DL grants if there is a difference between the total number of DL grants and the UL tDAI value. In some examples, the cDAI and tDAI check (e.g., at 824) between early-arriving DL grants and late-arriving DL grants may enable the UE 802 to detect if one or more early-arriving DL grants are missing. For example, if the UE fails to receive two early-arriving DL grants and two late-arriving, the UE may be able to detect the missing DL grants based on the uplink tDAI check.

Figure 9A:
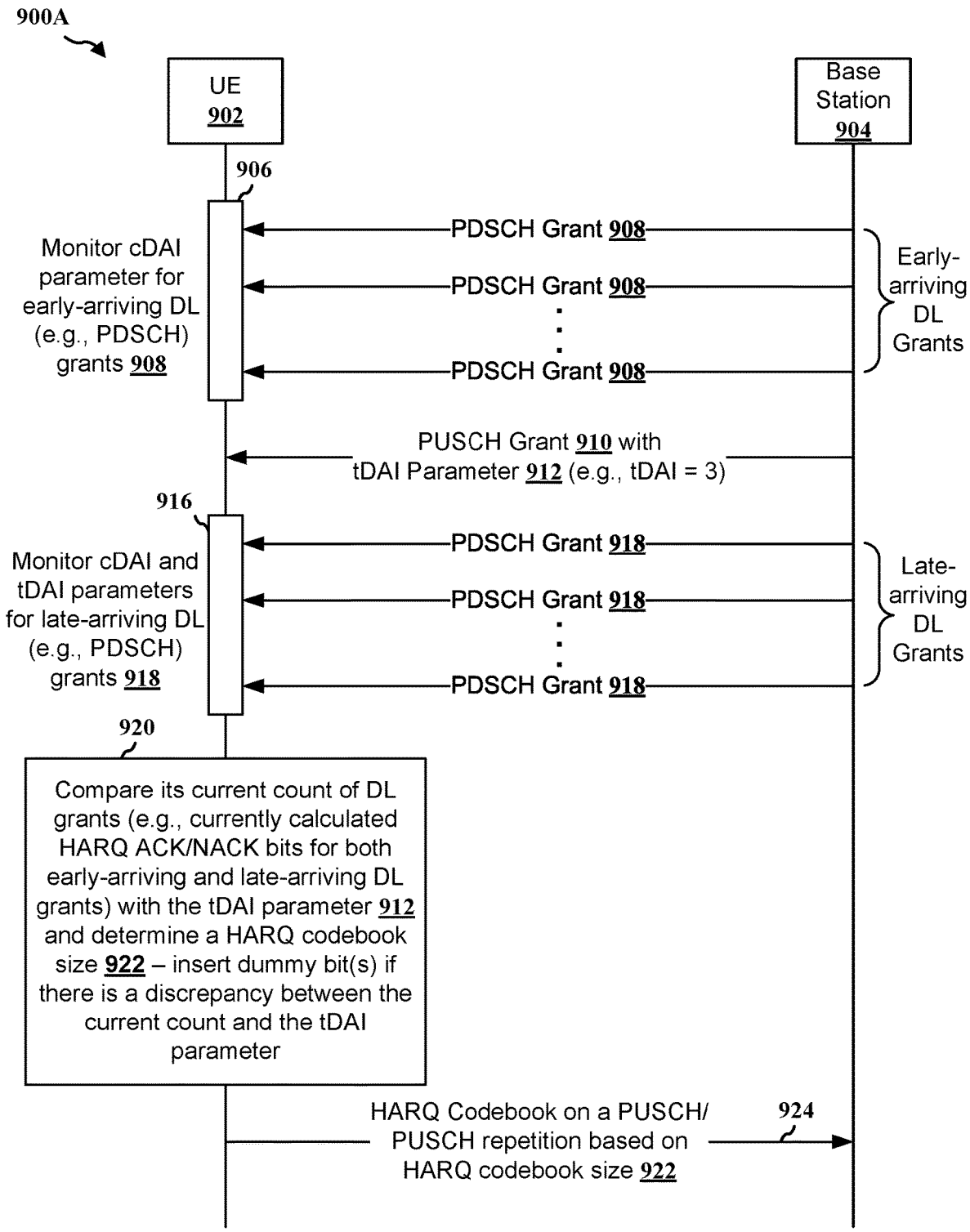
FIG. 9A is a communication flow illustrating an example of a UE monitoring and tracking one or more incoming DL grants based on cDAI and tDAI when the UE is configured to multiplex one or more late-arriving DL grants with at least one of PUSCH repetitions but without performing cDAI and tDAI check between early-arriving DL grants and late-arriving DL grants in accordance with various aspects of the present disclosure.

In another aspect of the present disclosure, a UE may be configured not to perform cDAI and tDAI check between early-arriving DL grants and late-arriving DL grants. FIG. 9A is a communication flow 900A illustrating an example of a UE monitoring and tracking one or more incoming DL grants based on cDAI and tDAI when the UE is configured to multiplex one or more late-arriving DL grants with at least one of PUSCH repetitions but without performing cDAI and tDAI check between early-arriving DL grants and late-arriving DL grants in accordance with various aspects of the present disclosure.

In one aspect, at 906, a UE 902 may be configured to monitor cDAI parameter for one or more PDSCH grants 908 transmitted from a base station 904 or a component of the base station 904 (e.g., PDSCH grants sent to the UE 902) that arrive prior to a PUSCH grant 910 (e.g., the one or more PDSCH grants 908 are early-arriving PDSCH grants), and the UE 902 may determine if any HARQ-ACK/NACK bits for the early-arriving DL grants are to be multiplexed to a PUSCH repetition.

At 916, the UE 902 may monitor one or more late-arriving DL grants (e.g., PDSCH grants 918) based on cDAI and tDAI parameters in the one or more late-arriving DL grants and determine if any HARQ-ACK/NACK bits for the late-arriving DL grants are to be multiplexed to the PUSCH repetition.

At 920, the UE 902 may compare its current count of PDSCH grants (e.g., currently calculated/accumulated HARQ-ACK/NACK bits for one or more PDSCH grants 908 (e.g., early-arriving PDSCH grants), and one or more PDSCH grants 918 (e.g., late-arriving PDSCH grants)) with possible values associated with the tDAI parameter 912 carried in the PUSCH grant 910 and determine a HARQ codebook size 922 for a HARQ codebook that is to be transmitted to the base station 904 carrying the HARQ-ACK/NACK bits of the one or more PDSCH grants 908 (e.g., early-arriving PDSCH grants) and one or more PDSCH grants 918 (e.g., late-arriving PDSCH grants). Similarly, at 920, the UE 902 may insert dummy bit(s) to the current count of PDSCH grants if there is a discrepancy between the current count and the tDAI parameter.

For example, referring back to FIG. 7, based on the monitoring of early-arriving DL grants and late-arriving DL grants (e.g., at 906 and 916), the UE may determine that two HARQ-ACK/NACK bits of two early-arriving DL grants and four HARQ-ACK/NACK bits of four late-arriving DL grants are to be multiplexed with the third PUSCH repetition at slot 14 (e.g., total ACK/NACK count: 2+4=6). The UE may compare the current count of DL grants (e.g., the calculated six HARQ-ACK/NACK bits) with the tDAI parameter 706. As the tDAI=3 may correspond to a HARQ codebook size of 3, 7, 11, 14 bits, and so on, the UE may round the current count of DL grants to a nearest HARQ codebook size supported by adding one or more dummy bit to the calculated HARQ-ACK/NACK bits. For example, as a HARQ codebook size of seven bits is closest to the current count of six PDSCH grants which may correspond to six HARQ-ACK/NACK bits, the UE may add a dummy bit to the six HARQ-ACK/NACK bits, such that the final HARQ codebook size 822 is seven bits (e.g., 6+1=7).

At 924, the UE 902 may multiplex the HARQ-ACK/NACK bits for one or more PDSCH grants 908 (e.g., early-arriving PDSCH grants) and one or more PDSCH grants 918 (e.g., late-arriving PDSCH grants) with a PUSCH repetition, where the size of the HARQ-ACK/NACK bits may be based on the determined HARQ codebook size 922, and the UE may transmit the PUSCH repetition to the base station 904. For example, referring back to FIG. 7, as the UE determines that the final codebook size is seven bits, the UE may multiplex seven HARQ-ACK/NACK bits (e.g., one of the bits is a dummy bit) with the third PUSCH repetition at slot 14, and the UE may transmit the third PUSCH to the base station.

Figure 10:
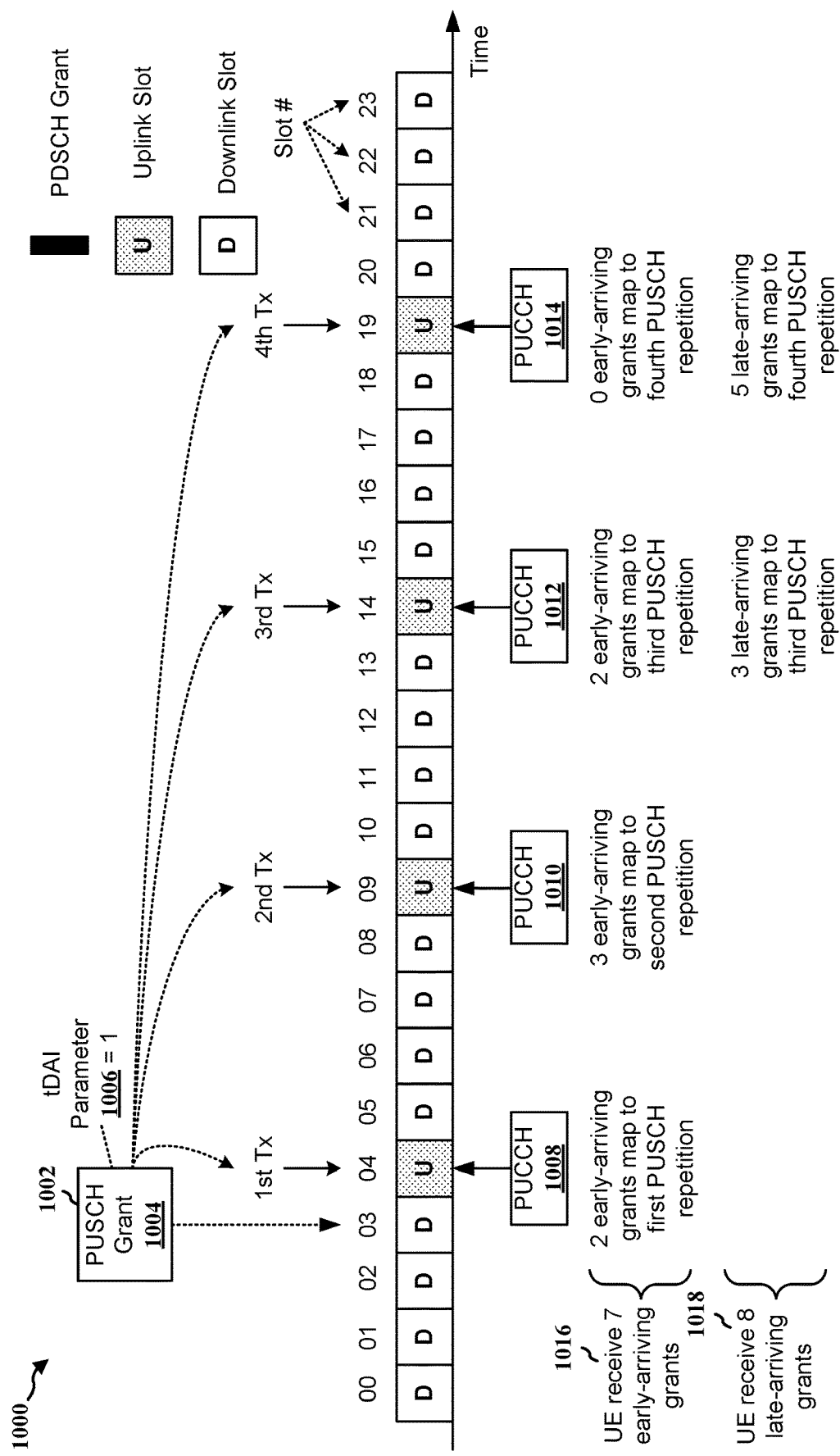
FIG. 10 is a diagram illustrating an example of multiplexing late-arriving DL grants with at least one of the second and subsequent PUSCH repetitions in accordance with various aspects of the present disclosure.

FIG. 10 is a diagram 1000 illustrating an example of multiplexing late-arriving DL grants with at least one of the second and subsequent PUSCH repetitions in accordance with various aspects of the present disclosure. As shown at 1002, a UE may receive a PDCCH in a DL slot (e.g., at slot 03) that carries a PUSCH grant 1004, where the PUSCH grant 1004 may include a tDAI parameter 1006 that indicates a value of one (e.g., tDAI=1). The PUSCH grant 1004 may indicate a PUSCH transmission constituting a total of four (4) PUSCH repetitions that are scheduled to be transmitted at slots 04, 09, 14, and 19, which may be associated with PUCCHs 1008, 1010, 1012, and 1014, respectively. The PUCCHs 1008, 1010, 1012, and 1014 may also correspond to or overlap with a first PUSCH repetition, a second PUSCH repetition, a third PUSCH repetition, and a fourth PUSCH repetition, respectively.

In one example, as shown at 1016, the UE may receive seven (7) early-arriving DL grants, where the UE may map HARQ-ACK/NACK bits of the seven early-arriving DL grants as 2-3-2-0 across the four PUSCH repetitions. For example, the UE may map HARQ-ACK/NACK bits of the first two (of the eight) early-arriving DL grants to the PUCCH 1008 that overlaps with the first PUSCH repetition, the UE may map HARQ-ACK/NACK bits of the next three early-arriving DL grants to the PUCCH 1010 that overlaps with the second PUSCH repetition, and the UE may map HARQ-ACK/NACK bits of the last two early-arriving DL grants to the PUCCH 1012 that overlaps with the third PUSCH repetition, etc. As the tDAI parameter 1006 may be a two-bit field, when the tDAI parameter 1006 equals to one (tDAI=1), the tDAI parameter 1006 may correspond to a HARQ codebook size of one, five, nine, or thirteen bits, and so on.

Then, as shown at 1018, the UE may receive eight (8) late-arriving DL grants. As the UE may be configured to not map HARQ-ACK/NACK bits of the late-arriving DL grants with the first PUSCH repetition and to map the HARQ-ACK/NACK bits of the late-arriving DL grants with at least one of the second and subsequent PUSCH repetitions, in one example, the UE may map HARQ-ACK/NACK bits of the eight late-arriving DL grants as 0-0-3-5 across the four PUSCH repetitions. For example, the UE may map HARQ-ACK/NACK bits of the first three late-arriving DL grants to the PUCCH 1012 that overlaps with the third PUSCH repetition, and the UE may map HARQ-ACK/NACK bits of the next (or last) five late-arriving DL grants to the PUCCH 1014 that overlaps with the fourth PUSCH repetition, etc.

As discussed in association with FIG. 8, the UE may track the incoming DL grants via cDAI and tDAI based on the followings. For example, for determining HARQ-ACK/NACK bits of early-arriving DL grants and late-arriving DL grants that are to be multiplexed with the third PUSCH repetition (e.g., to be transmitted at slot 14), the UE may first monitor cDAI for all DL grants that arrive prior to PUSCH grant 1004 (e.g., all early-arriving DL grants), such as shown at 806 of FIG. 8. Based on the monitoring of the cDAI, the UE may know that there are two HARQ-ACK/NACK bits of two early-arriving DL grants are to be multiplexed with the third PUSCH repetition (e.g., cDAI=2). Then, the UE may compare this HARQ-ACK/NACK bits (e.g., 2) with the value indicated by the tDAI parameter 1006 (e.g., tDAI=1), and the UE may insert one or more dummy bits to the HARQ-ACK/NACK bits if there is a difference between cDAI and tDAI, such as shown at 814 of FIG. 8. For example, as cDAI=2 and tDAI=1 (which corresponds to 5, 9, 13, etc.), the UE may add three (3) dummy bits to the HARQ-ACK/NACK bits such that the total count for the HARQ-ACK/NACK bits of early-arriving DL grants is five bits (e.g., cDAI=2+3=5), which matches one of the values associated with the tDAI=1. Then, as shown at 816 of FIG. 8, the UE may monitor late-arriving DL grants based on cDAI and tDAI in the DL grants. In this example, the UE may detect that HARQ feedback for three late-arriving DL grants (e.g., if all DL grants are successfully received and decoded) are to be mapped to the third PUSCH repetition, and the UE may determine that the current ACK/NACK count is eight bits (e.g., 5+3=8). Then, as shown at 820 of FIG. 8, the UE may compare the current ACK/NACK count again with the value indicated by the tDAI parameter 1006. As the tDAI=1 may correspond to a HARQ codebook size of 1, 5, 9, 13 bits, and so on, the UE may round the current count of DL grants to a nearest HARQ codebook size supported by adding one or more dummy bit. For example, as a HARQ codebook size of nine bits is closest to the current ACK/NACK count of eight bits, the UE may add a dummy bit to the current ACK/NACK count, such that the final codebook size is nine bits (e.g., 8+1=9).

In another aspect of the present disclosure, for a UE and a base station to have a consistent determination/calculation of the HARQ codebook size (e.g., the HARQ codebook size expected by the base station matches the HARQ codebook size determined by the UE), the UE and the base station may be configured to handle/interpret the uplink tDAI (e.g., the tDAI parameter in an UL grant) differently based on the settings. In other words, for a UE to apply tDAI/cDAI check for early-arriving DL grants and/or late-arriving DL grants, the base station may select the value for the uplink tDAI based on a set of rules.

In one aspect (e.g., Option 1), the base station may be configured to ignore uplink tDAI when the base station is transmitting late-arriving DL grants to the UE. As such, the tDAI of late-arriving DL grants may be incremented as per previous DL grants, and the uplink tDAI is not factored in. In response, the UE may compare the counted DL grants against uplink tDAI at the final step before determining codebook size, as described in connection at 920 of FIG. 9A.

In another aspect (e.g., Option 2), the base station may take uplink tDAI into account before transmitting late-arriving DL grants to the UE, where the tDAI and cDAI of late-arriving DL grants may get incremented using uplink tDAI as a reference. In response, the UE may be configured to perform a tDAI/cDAI check between the early-arriving DL grants and the late-arriving DL grants, such as described in connection with 814 of FIG. 8. In other words, the UE may compare the counted DL grants with the uplink tDAI twice (e.g., at 814 and at 820 as shown in FIG. 8). This aspect may be useful when the UE fails to receive/decode one or more early-arriving DL grants and/or one or more late-arriving DL grants.

In another aspect (e.g., Option 3), the base station may reset the cDAI across the boundary between early-arriving DL grants and late-arriving DL grants, such that there may be two HARQ codebooks which may be concatenated. In other words, the base statin may treat the early-arriving DL grants and the late-arriving DL grants as separate entities, and the base station may expect the UE to determine HARQ codebooks for the early-arriving DL grants and the late-arriving DL grants separately. For example, referring back to FIG. 7, at slot 14, the UE may form a first HARQ codebook for the two early-arriving DL grants based on monitoring the cDAI for early-arriving DL grants and based on comparing the counted value to uplink tDAI, such as described in connection with 806 and 814 of FIG. 8. Then, for subsequent late-arriving DL grants, the UE may reset the cDAI and monitor the cDAI for late-arriving DL grants, and the UE may form a second codebook for the four late-arriving DL grants based on monitoring the cDAI for late-arriving DL grants. After forming the first codebook and the second codebook for the early-arriving DL grants and the late-arriving DL grants, respectively, the UE may concatenate the first codebook and the second codebook and transmit a combined codebook to the base station. In other words, the UE may reset cDAI handling at the boundary, and the UE may run the pseudocode twice, which may be equivalent to having two separate codebooks—one for early grants and another for late grants.

In another aspect (e.g., Option 4), the base station may use uplink tDAI for first PUSCH repetition, and the base station and the UE may disregard uplink tDAI for subsequent PUSCH repetitions. In response, the UE may check against uplink tDAI for first PUSCH repetition transmission. For subsequent PUSCH repetition transmissions, the UE may rely on downlink tDAI (e.g., the tDAI parameter in DL grant) to derive a HARQ codebook size. For example, referring back to FIG. 7, in determining the HARQ codebook size for the first PUSCH repetition at slot 04, the UE may rely on the tDAI parameter 706. For the second and subsequent PUSCH repetitions (e.g., at slots 09, 14, 19), the UE may be configured to ignore the tDAI parameter 706, and the UE may determine the HARQ codebook size for the second and subsequent PUSCH repetitions based on the tDAI parameter and/or cDAI parameter in DL grants. For example, latest arriving DL grant that may be multiplexed may be based on N1/N2 timeline determined by starting symbol of PUSCH/PUCCH.

Figure 9B:
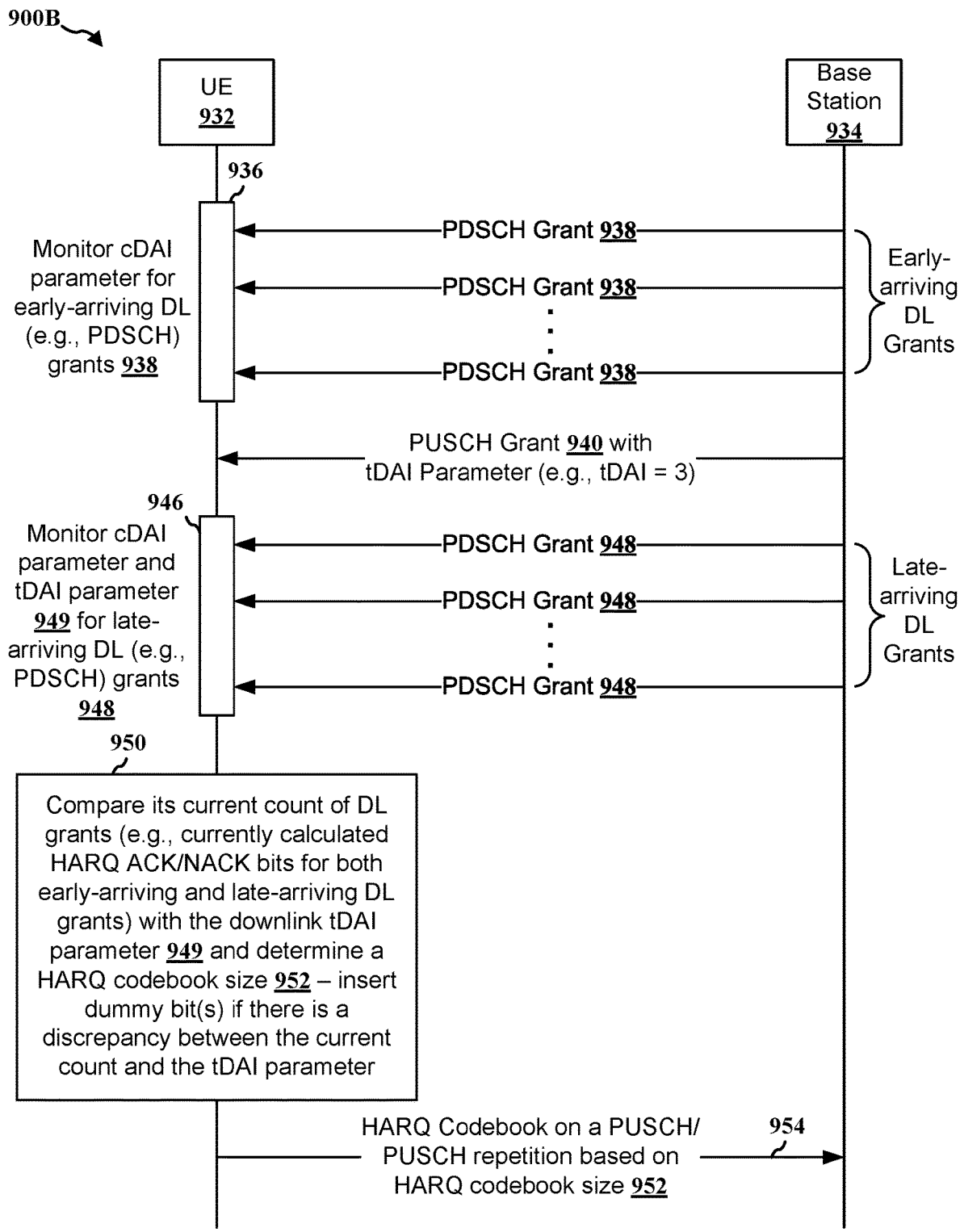
FIG. 9B is a communication flow illustrating an example of a UE monitoring and tracking one or more incoming DL grants based on cDAI and tDAI when the UE is configured to multiplex one or more late-arriving DL grants with at least one of PUSCH repetitions but without performing cDAI and tDAI check between early-arriving DL grants and late-arriving DL grants in accordance with various aspects of the present disclosure.

FIG. 9B is a communication flow 900B illustrating an example of a UE monitoring and tracking one or more incoming DL grants based on cDAI and tDAI when the UE is configured to multiplex one or more late-arriving DL grants with at least one of PUSCH repetitions but without performing cDAI and tDAI check between early-arriving DL grants and late-arriving DL grants in accordance with various aspects of the present disclosure. In this example, the UE may rely on downlink tDAI (e.g., the tDAI parameter in DL grant) to derive a HARQ codebook size (e.g., Option 4).

In one aspect, at 936, a UE 932 may be configured to monitor cDAI parameter for one or more PDSCH grants 938 transmitted from a base station 934 or a component of the base station 934 (e.g., PDSCH grants sent to the UE 932) that arrive prior to a PUSCH grant 940 (e.g., the one or more PDSCH grants 938 are early-arriving PDSCH grants), and the UE 932 may determine if any HARQ-ACK/NACK bits for the early-arriving DL grants are to be multiplexed to a PUSCH repetition.

At 946, the UE 932 may monitor one or more late-arriving DL grants (e.g., PDSCH grants 948) based on cDAI and tDAI parameters in the one or more late-arriving DL grants and determine if any HARQ-ACK/NACK bits for the late-arriving DL grants are to be multiplexed to the PUSCH repetition.

At 950, the UE 932 may compare its current count of PDSCH grants (e.g., currently calculated/accumulated HARQ-ACK/NACK bits for one or more PDSCH grants 938 (e.g., early-arriving PDSCH grants), and one or more PDSCH grants 948 (e.g., late-arriving PDSCH grants)) with possible values associated with the tDAI parameter 949 carried in the PDSCH grant(s) 948 and determine a HARQ codebook size 952 for a HARQ codebook that is to be transmitted to the base station 934 carrying the HARQ-ACK/NACK bits of the one or more PDSCH grants 938 (e.g., early-arriving PDSCH grants) and one or more PDSCH grants 948 (e.g., late-arriving PDSCH grants). Similarly, at 950, the UE 932 may insert dummy bit(s) to the current count of PDSCH grants if there is a discrepancy between the current count and the tDAI parameter.

At 954, the UE 932 may multiplex the HARQ-ACK/NACK bits for one or more p PDSCH grants 938 (e.g., early-arriving PDSCH grants) and one or more PDSCH grants 948 (e.g., late-arriving PDSCH grants) with a PUSCH repetition, where the size of the HARQ-ACK/NACK bits may be based on the determined HARQ codebook size 952, and the UE may transmit the PUSCH repetition to the base station 934.

Figure 11:
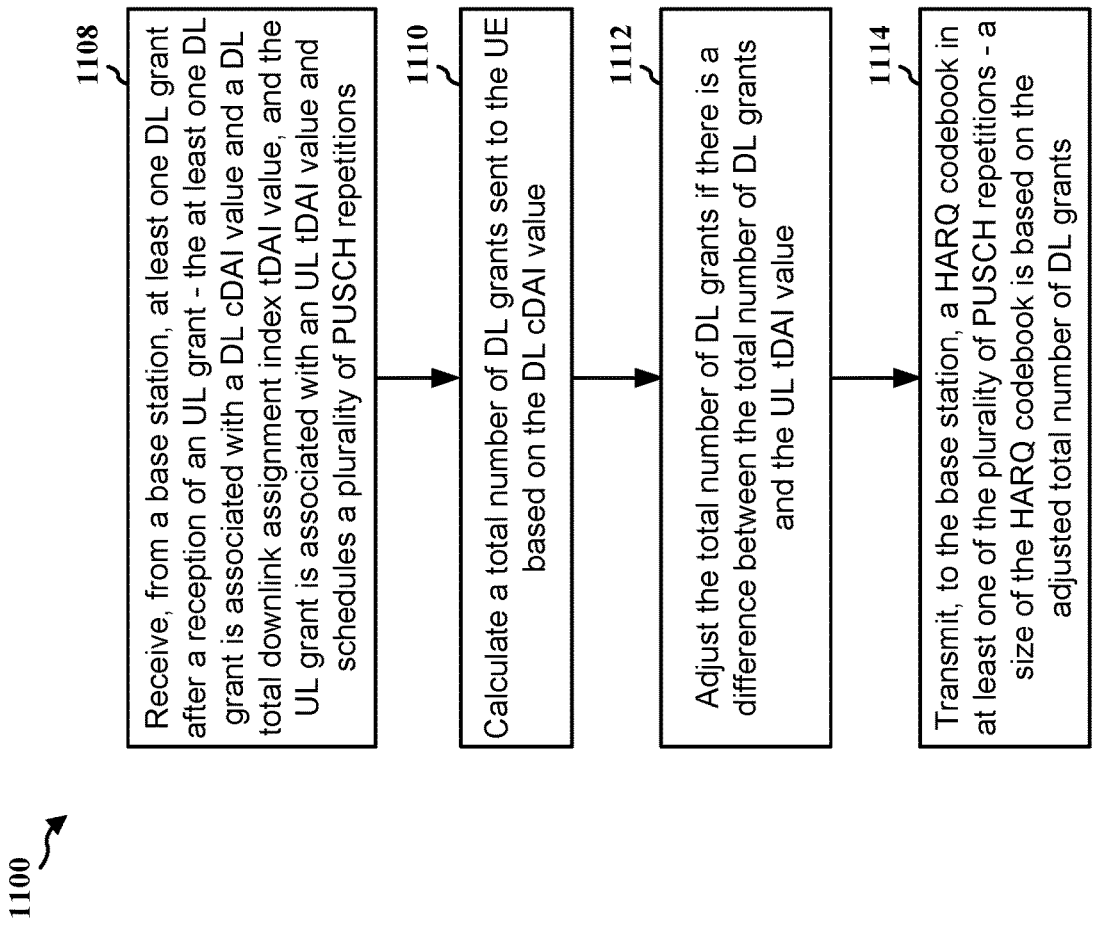
FIG. 11 is a flowchart of a method of wireless communication in accordance with aspects presented herein.

FIG. 11 is a flowchart 1100 of a method of wireless communication. The method may be performed by a UE or a component of a UE (e.g., the UE 104, 350, 401, 601, 802, 902, 932; the apparatus 1302; a processing system, which may include the memory 360 and which may be the entire UE 350 or a component of the UE 350, such as the TX processor 368, the RX processor 356, and/or the controller/processor 359). The method may enable a UE to multiplex HARQ-ACK/NACK bits of DL grants that arrive after an uplink grant with PUSCH repetitions while keeping a track of tDAI.

In one example, a UE may receive one or more DL grants prior to the reception of the UL grant, where the one or more DL grants are associated with a DL cDAI, such as described in connection with FIGS. 8, 9A, and/or 9B. For example, at 806, the UE 802 may receive, from the base station 804, one or more PDSCH grants 808 prior to the reception of the PUSCH grant 810, where the one or more PDSCH grants 808 are associated with a DL cDAI. The reception of the one or more DL grants prior to the reception of the UL grant may be performed by, e.g., the DL grant process component 1340 and/or the reception component 1330 of the apparatus 1302 in FIG. 13.

In another example, the UE may determine whether there is a difference between the UL tDAI value and a total number of DL grants sent to the UE until reception of the one or more DL grants, such as described in connection with FIG. 8. For example, at 814, the UE 802 may determine whether there is a difference between the tDAI parameter 812 of the PUSCH grant 810 and a total number of PDSCH grants received until reception of the one or more PDSCH grants 818. The determination of whether there is a difference between the UL tDAI value and a total number of DL grants sent to the UE may be performed by, e.g., the DL grant number verification component 1342 of the apparatus 1302 in FIG. 13.

In another example, the UE may adjust the total number of DL grants sent to the UE until reception of the one or more DL grants if there is a difference between the UL tDAI value and the total number of DL grants received until reception of the one or more DL grants, such as described in connection with FIG. 8. For example, at 814, the UE 802 may adjust the total number of PDSCH grants received by inserting one or more dummy bits if there is a discrepancy between the UL tDAI value and the total number of DL grants. The adjustment of the total number of DL grants may be performed by, e.g., the adjustment component 1344 of the apparatus 1302 in FIG. 13.

At 1108, the UE may receive, from a base station, at least one DL grant after a reception of an UL grant, where the at least one DL grant may be associated with a DL cDAI value and a DL tDAI value, and the UL grant may be associated with an UL tDAI value and scheduling a plurality of PUSCH repetitions, such as described in connection with FIGS. 8, 9A, and/or 9B. For example, at 816, the UE 802 may receive, from the base station 804, one or more PDSCH grants 818 after a reception of the PUSCH grant 810, where the one or more PDSCH grants 818 are associated with a DL cDAI value and a DL tDAI value and the PUSCH grant is associated with a tDAI parameter 812. The reception of the at least one DL grant after a reception of an UL grant may be performed by, e.g., the DL grant process component 1340 and/or the reception component 1330 of the apparatus 1302 in FIG. 13. The at least one DL grant may be at least one PDSCH grant and the UL grant may be a PUSCH grant.

In one example, the DL cDAI associated with the one or more DL grants may be different from the DL cDAI associated with the at least one DL grant.

At 1110, the UE may calculate a total number of DL grants sent to the UE based on the DL cDAI value, such as described in connection with FIGS. 8, 9A, and/or 9B. For example, at 820, the UE 802 may count total number of PDSCH grants received based on the DL cDAI value. The calculation of total number of DL grants sent to the UE based on the DL cDAI value may be performed by, e.g., the DL grant number verification component 1342 of the apparatus 1302 in FIG. 13.

At 1112, the UE may adjust the total number of DL grants if there is a difference between the total number of DL grants and the UL tDAI value, such as described in connection with FIGS. 8, 9A, and/or 9B. For example, at 820, the UE 802 may adjust the total number of PDSCH grants by inserting dummy bit(s) if there is a discrepancy between the current count and the tDAI parameter 812. The adjustment of the total number of DL grants may be performed by, e.g., the adjustment component 1344 of the apparatus 1302 in FIG. 13.

In one example, to adjust the total number of DL grants if there is a difference between the total number of DL grants sent to the UE and the UL tDAI value, the UE may add one or more counts to the total number of DL grants. In such an example, the UE may add one or more padding bits or dummy bits to the HARQ codebook based on the one or more counts added to the total number of DL grants.

In another example, the UE may receive, from the base station, at least one repetition of the UL grant. In such an example, the HARQ codebook may be multiplexed with the at least one repetition of the UL grant. In such an example, a PUCCH carrying one or more HARQ feedback bits of the at least one DL grant overlaps with a PUSCH of one of the at least one repetition of the UL grant.

At 1114, the UE may transmit, to the base station, a HARQ codebook in at least one of the plurality of PUSCH repetitions, where a size of the HARQ codebook may be based on the adjusted total number of DL grants, such as described in connection with FIGS. 8, 9A, and/or 9B. For example, at 824, the UE 802 may transmit, to the base station 804, a HARQ codebook on a PUSCH/PUSCH repetition based on HARQ codebook size 822. The transmission of the HARQ codebook may be performed by, e.g., the HARQ codebook generation component 1346 and/or the transmission component 1334 of the apparatus 1302 in FIG. 13. The HARQ codebook may correspond to a HARQ ACK/NACK codebook.

In one example, the HARQ codebook may be multiplexed with a first repetition of the UL grant. In such an example, the UE may determine a size of a HARQ codebook for one or more repetitions of the UL grant subsequent to the first repetition based on the DL tDAI value. In such an example, the UE may determine the size of a HARQ codebook for the one or more repetitions of the UL grant subsequent to the first repetition without the UL tDAI value. In such an example, the UE may discard the UL tDAI value after the size of the HARQ codebook is determined or after the HARQ codebook is multiplexed with the first repetition of the UL grant.

In another example, the HARQ codebook may be multiplexed with one PUSCH repetition.

In another example, the HARQ codebook may be excluded from multiplexing with a first PUSCH repetition.

In another example, the UE may determine whether there is a difference between the total number of DL grants sent to the UE and the UL tDAI value of the UL grant prior to determine the size of the HARQ codebook.

Figure 12:
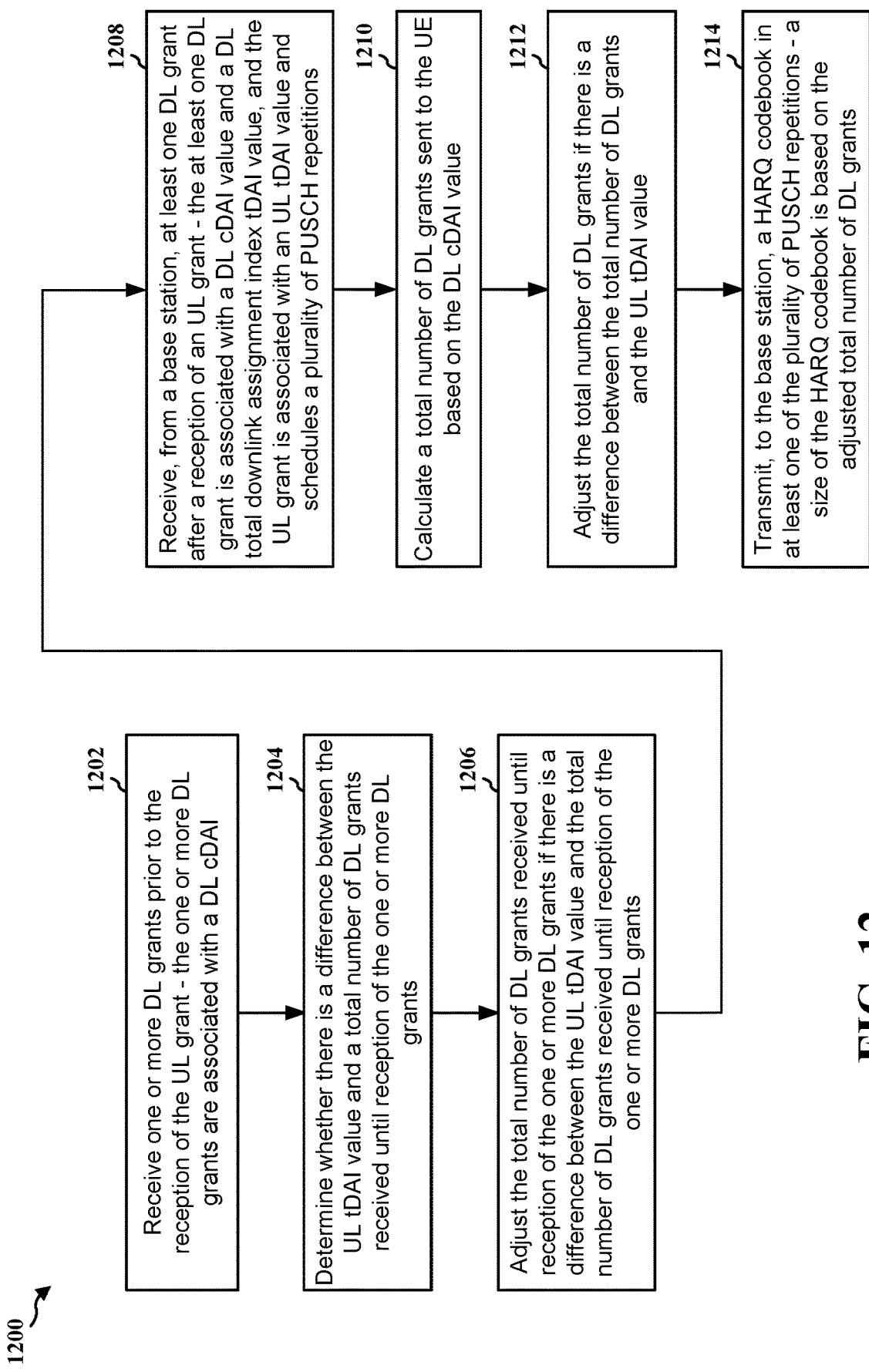
FIG. 12 is a flowchart of a method of wireless communication in accordance with aspects presented herein.

FIG. 12 is a flowchart 1200 of a method of wireless communication. The method may be performed by a UE or a component of a UE (e.g., the UE 104, 350, 401, 601, 802, 902, 932; the apparatus 1302; a processing system, which may include the memory 360 and which may be the entire UE 350 or a component of the UE 350, such as the TX processor 368, the RX processor 356, and/or the controller/processor 359). The method may enable a UE to multiplex HARQ-ACK/NACK bits of DL grants that arrive after an uplink grant with PUSCH repetitions while keeping a track of tDAI.

At 1202, a UE may receive one or more DL grants prior to the reception of the UL grant, where the one or more DL grants are associated with a DL cDAI, such as described in connection with FIGS. 8, 9A, and/or 9B. For example, at 806, the UE 802 may receive, from the base station 804, one or more PDSCH grants 808 prior to the reception of the PUSCH grant 810, where the one or more PDSCH grants 808 are associated with a DL cDAI. The reception of the one or more DL grants prior to the reception of the UL grant may be performed by, e.g., the DL grant process component 1340 and/or the reception component 1330 of the apparatus 1302 in FIG. 13.

At 1204, the UE may determine whether there is a difference between the UL tDAI value and a total number of DL grants sent to the UE until reception of the one or more DL grants, such as described in connection with FIG. 8. For example, at 814, the UE 802 may determine whether there is a difference between the tDAI parameter 812 of the PUSCH grant 810 and a total number of PDSCH grants received until reception of the one or more PDSCH grants 818. The determination of whether there is a difference between the UL tDAI value and a total number of DL grants sent to the UE may be performed by, e.g., the DL grant number verification component 1342 of the apparatus 1302 in FIG. 13.

At 1206, the UE may adjust the total number of DL grants received until reception of the one or more DL grants if there is a difference between the UL tDAI value and the total number of DL grants received until reception of the one or more DL grants, such as described in connection with FIG. 8. For example, at 814, the UE 802 may adjust the total number of PDSCH grants received by inserting one or more dummy bits if there is a discrepancy between the UL tDAI value and the total number of DL grants. The adjustment of the total number of DL grants may be performed by, e.g., the adjustment component 1344 of the apparatus 1302 in FIG. 13.

At 1208, the UE may receive, from a base station, at least one DL grant after a reception of an UL grant, where the at least one DL grant may be associated with a DL cDAI value and a DL tDAI value, and the UL grant may be associated with an UL tDAI value and scheduling a plurality of PUSCH repetitions, such as described in connection with FIGS. 8, 9A, and/or 9B. For example, at 816, the UE 802 may receive, from the base station 804, one or more PDSCH grants 818 after a reception of the PUSCH grant 810, where the one or more PDSCH grants 818 are associated with a DL cDAI value and a DL tDAI value and the PUSCH grant is associated with a tDAI parameter 812. The reception of the at least one DL grant after a reception of an UL grant may be performed by, e.g., the DL grant process component 1340 and/or the reception component 1330 of the apparatus 1302 in FIG. 13. The at least one DL grant may be at least one PDSCH grant and the UL grant may be a PUSCH grant.

In one example, the DL cDAI associated with the one or more DL grants may be different from the DL cDAI associated with the at least one DL grant.

At 1210, the UE may calculate a total number of DL grants sent to the UE based on the DL cDAI value, such as described in connection with FIGS. 8, 9A, and/or 9B. For example, at 820, the UE 802 may count total number of PDSCH grants received based on the DL cDAI value. The calculation of total number of DL grants sent to the UE based on the DL cDAI value may be performed by, e.g., the DL grant number verification component 1342 of the apparatus 1302 in FIG. 13.

At 1212, the UE may adjust the total number of DL grants if there is a difference between the total number of DL grants and the UL tDAI value, such as described in connection with FIGS. 8, 9A, and/or 9B. For example, at 820, the UE 802 may adjust the total number of PDSCH grants by inserting dummy bit(s) if there is a discrepancy between the current count and the tDAI parameter 812. The adjustment of the total number of DL grants may be performed by, e.g., the adjustment component 1344 of the apparatus 1302 in FIG. 13.

In one example, to adjust the total number of DL grants if there is a difference between the total number of DL grants and the UL tDAI value, the UE may add one or more counts to the total number of DL grants. In such an example, the UE may add one or more padding bits or dummy bits to the HARQ codebook based on the one or more counts added to the total number of DL grants.

In another example, the UE may receive, from the base station, at least one repetition of the UL grant. In such an example, the HARQ codebook may be multiplexed with the at least one repetition of the UL grant. In such an example, a PUCCH carrying one or more HARQ feedback bits of the at least one DL grant overlaps with a PUSCH of one of the at least one repetition of the UL grant.

At 1214, the UE may transmit, to the base station, a HARQ codebook in at least one of the plurality of PUSCH repetitions, where a size of the HARQ codebook may be based on the adjusted total number of DL grants, such as described in connection with FIGS. 8, 9A, and/or 9B. For example, at 824, the UE 802 may transmit, to the base station 804, a HARQ codebook on a PUSCH/PUSCH repetition based on HARQ codebook size 822. The transmission of the HARQ codebook may be performed by, e.g., the HARQ codebook generation component 1346 and/or the transmission component 1334 of the apparatus 1302 in FIG. 13. The HARQ codebook may correspond to a HARQ ACK/NACK codebook.

In one example, the HARQ codebook may be multiplexed with a first repetition of the UL grant. In such an example, the UE may determine a size of a HARQ codebook for one or more repetitions of the UL grant subsequent to the first repetition based on the DL tDAI value. In such an example, the UE may determine the size of a HARQ codebook for the one or more repetitions of the UL grant subsequent to the first repetition without the UL tDAI value. In such an example, the UE may discard the UL tDAI value after the size of the HARQ codebook is determined or after the HARQ codebook is multiplexed with the first repetition of the UL grant.

In another example, the HARQ codebook may be multiplexed with one PUSCH repetition.

In another example, the HARQ codebook may be excluded from multiplexing with a first PUSCH repetition.

In another example, the UE may determine whether there is a difference between the total number of DL grants sent to the UE and the UL tDAI value of the UL grant prior to determine the size of the HARQ codebook.

Figure 13:
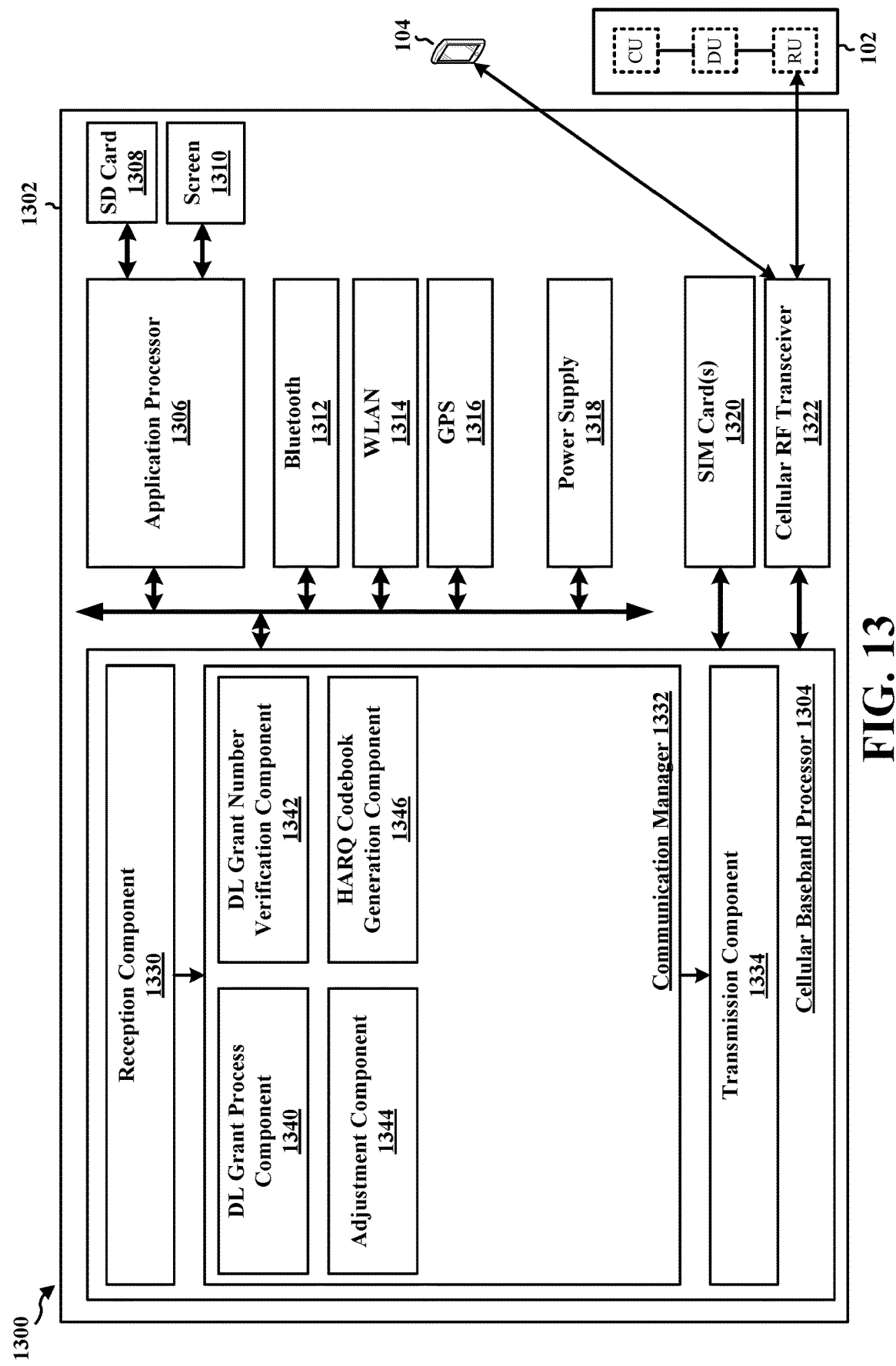
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a DL grant process component 1340 that is configured to receive one or more DL grants prior to the reception of the UL grant, where the one or more DL grants are associated with a DL cDAI, e.g., as described in connection with 1202 of FIG. 12, and/or configured to receive, from a base station, at least one DL grant after a reception of an UL grant, the at least one DL grant being associated with a DL cDAI value and a DL tDAI value, the UL grant being associated with an UL tDAI value and scheduling a plurality of PUSCH repetitions, e.g., as described in connection with 1108 of FIG. 11 and/or 1208 of FIG. 12. The communication manager 1332 further includes a DL grant number verification component 1342 that is configured to determine whether there is a difference between the UL tDAI value and a total number of DL grants sent to the UE until reception of the one or more DL grants, e.g., as described in connection with 1204 of FIG. 12, and/or configured to calculate a total number of DL grants sent to the UE based on the DL cDAI value, e.g., as described in connection with 1110 of FIG. 11 and/or 1210 of FIG. 12. The communication manager 1332 further includes an adjustment component 1344 that is configured to adjust the total number of DL grants received until reception of the one or more DL grants if there is a difference between the UL tDAI value and the total number of DL grants received until reception of the one or more DL grants, e.g., as described in connection with 1206 of FIG. 12, and/or configured to adjust the total number of DL grants if there is a difference between the total number of DL grants and the UL tDAI value, e.g., as described in connection with 1112 of FIG. 11 and/or 1212 of FIG. 12. The communication manager 1332 further includes a HARQ codebook generation component 1346 that is configured to transmit, to the base station, a HARQ codebook in at least one of the plurality of PUSCH repetitions, a size of the HARQ codebook being based on the adjusted total number of DL grants, e.g., as described in connection with 1114 of FIG. 11 and/or 1214 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, at least one DL grant after a reception of an UL grant, the at least one DL grant being associated with a DL cDAI value and a DL tDAI value, the UL grant being associated with an UL tDAI value and scheduling a plurality of PUSCH repetitions (e.g., the DL grant process component 1340 and/or the reception component 1330). The apparatus 1302 includes means for calculating a total number of DL grants sent to the UE based on the DL cDAI value (e.g., the DL grant number verification component 1342). The apparatus 1302 includes means for adjusting the total number of DL grants if there is a difference between the total number of DL grants and the UL tDAI value (e.g., the adjustment component 1344). The apparatus 1302 includes means for transmitting, to the base station, a HARQ codebook in at least one of the plurality of PUSCH repetitions, a size of the HARQ codebook being based on the adjusted total number of DL grants (e.g., the HARQ codebook generation component 1346). The apparatus 1302 includes means for receiving one or more DL grants prior to the reception of the UL grant, where the one or more DL grants are associated with a DL cDAI (e.g., the DL grant process component 1340 and/or the reception component 1330). The apparatus 1302 includes means for determining whether there is a difference between the UL tDAI value and a total number of DL grants sent to the UE until reception of the one or more DL grants (e.g., the DL grant number verification component 1342). The apparatus 1302 includes means for adjusting the total number of DL grants received until reception of the one or more DL grants if there is a difference between the UL tDAI value and the total number of DL grants received until reception of the one or more DL grants (e.g., the adjustment component 1344).

In one configuration, the DL cDAI associated with the one or more DL grants may be different from the DL cDAI associated with the at least one DL grant.

In another configuration, the means for adjusting the total number of DL grants if there is a difference between the total number of DL grants and the UL tDAI value includes means for adding one or more counts to the total number of DL grants. In such a configuration, the apparatus 1302 includes means for adding one or more padding bits or dummy bits to the HARQ codebook based on the one or more counts added to the total number of DL grants.

In another configuration, the apparatus 1302 includes means for receiving, from the base station, at least one repetition of the UL grant. In such a configuration, the HARQ codebook may be multiplexed with the at least one repetition of the UL grant. In such a configuration, a PUCCH carrying one or more HARQ feedback bits of the at least one DL grant overlaps with a PUSCH of one of the at least one repetition of the UL grant.

In another configuration, the HARQ codebook may be multiplexed with a first repetition of the UL grant. In such a configuration, the apparatus 1302 includes means for determining a size of a HARQ codebook for one or more repetitions of the UL grant subsequent to the first repetition based on the DL tDAI value. In such a configuration, the apparatus 1302 includes means for determining the size of a HARQ codebook for the one or more repetitions of the UL grant subsequent to the first repetition without the UL tDAI value. In such a configuration, the apparatus 1302 includes means for discarding the UL tDAI value after the size of the HARQ codebook is determined or after the HARQ codebook is multiplexed with the first repetition of the UL grant.

In another configuration, the HARQ codebook may be multiplexed with one PUSCH repetition.

In another configuration, the HARQ codebook may be excluded from multiplexing with a first PUSCH repetition.

In another configuration, the apparatus 1302 includes means for determining whether there is a difference between the total number of DL grants sent to the UE and the UL tDAI value of the UL grant prior to determine the size of the HARQ codebook.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
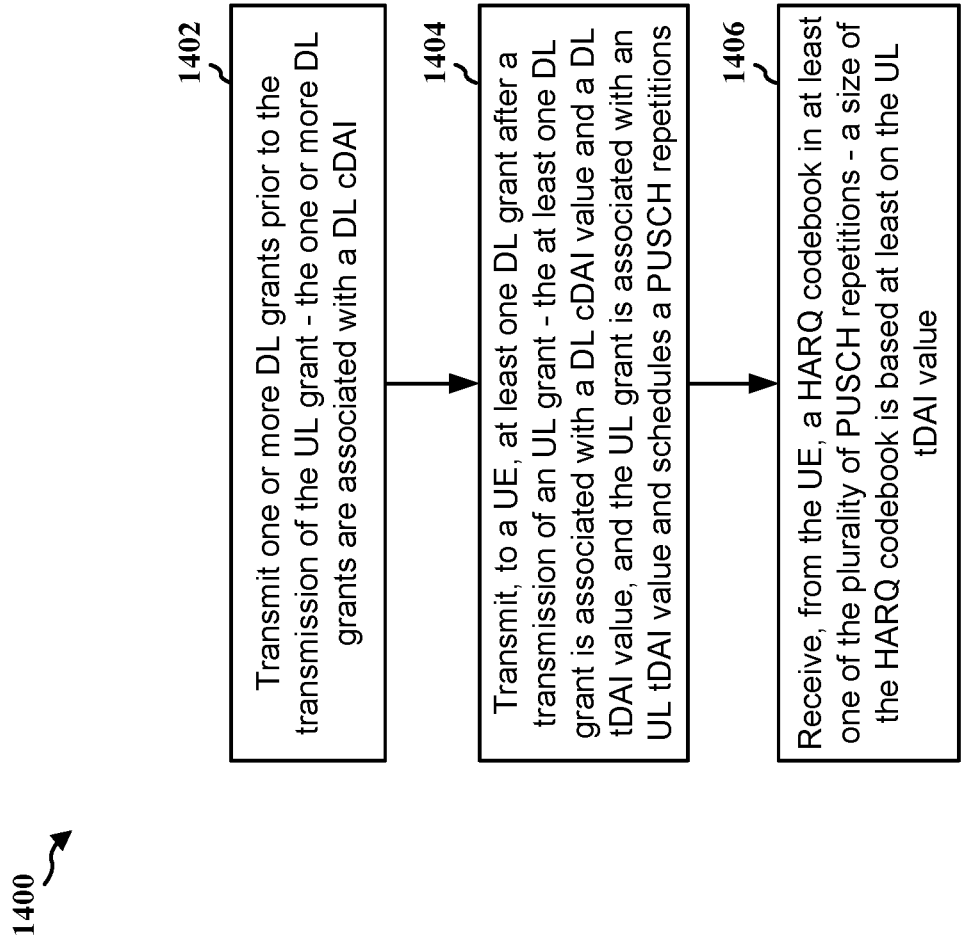
FIG. 14 is a flowchart of a method of wireless communication in accordance with aspects presented herein.

FIG. 14 is a flowchart 1400 of a method of wireless communication. The method may be performed by a base station or a component of a base station (e.g., the base station 102, 310, 403, 603, 804, 904, 934; the apparatus 1502; a processing system, which may include the memory 376 and which may be the entire base station 310 or a component of the base station 310, such as the TX processor 316 the RX processor 370, and/or the controller/processor 375). The method may enable the base station to receive a HARQ codebook in a PUSCH repetition that includes HARQ-ACK/NACK bits of DL grants that are transmitted after the uplink grant that schedules the PUSCH repetition.

At 1402, the base station may transmit one or more DL grants prior to the transmission of the UL grant, where the one or more DL grants may be associated with a DL cDAI, such as described in connection with FIGS. 8, 9A, and/or 9B. For example, at 806, the base station 804 may transmit one or more PDSCH grants 808 prior to the transmission of the PUSCH grant 810, where the one or more PDSCH grants may be associated with a DL cDAI. The transmission of the one or more DL grants prior to the transmission of the UL grant may be performed by, e.g., the cDAI/tDAI configuration component 1540 and/or the transmission component 1534 of the apparatus 1502 in FIG. 15. The at least one DL grant may be at least one PDSCH grant and the UL grant may be a PUSCH grant.

At 1404, the base station may transmit, to a UE, at least one DL grant after a transmission of an UL grant, where the at least one DL grant may be associated with a DL cDAI value and a DL tDAI value, and the UL grant may be associated with an UL tDAI value and scheduling a plurality of PUSCH repetitions, such as described in connection with FIGS. 8, 9A, and/or 9B. For example, at 816, the base station 804 may transmit, to the UE 802, one or more PDSCH grants 818 after transmitting the PUSCH grant 810 that includes a tDAI parameter 812, the one or more PDSCH grants 818 may be associated with a DL cDAI value and a DL tDAI value. The transmission of the at least one DL grant after a transmission of an UL grant may be performed by, e.g., the cDAI/tDAI configuration component 1540 and/or the transmission component 1534 of the apparatus 1502 in FIG. 15.

In one example, the DL cDAI associated with the one or more DL grants may be different from the DL cDAI associated with the at least one DL grant. In such an example, the DL cDAI associated with the one or more DL grants may be reset prior to the transmission of the at least one DL grant.

In another example, the base station may increment the tDAI value associated with the at least one DL grant per previous DL grant.

In another example, the base station may increment tDAI value and the cDAI value associated with the at least one DL grant using the UL tDAI value as a reference.

At 1406, the base station may receive, from the UE, a HARQ codebook in at least one of the plurality of PUSCH repetitions, where a size of the HARQ codebook may be based at least on the UL tDAI value, such as described in connection with FIGS. 8, 9A, and/or 9B. For example, at 824, the base station 804 may receive, from the UE 802, a HARQ codebook with a HARQ codebook size that is determined based at least in part on the UL tDAI value. The reception of the HARQ codebook may be performed by, e.g., the HARQ codebook process component 1542 and/or the reception component 1530 of the apparatus 1502 in FIG. 15. The HARQ codebook may correspond to a HARQ ACK/NACK codebook.

In one example, the base station may transmit, to the UE, at least one repetition of the UL grant. In such an example, the HARQ codebook may be associated with the at least one repetition of the UL grant. In such an example, the HARQ codebook may be associated with a first repetition of the UL grant. In such an example, the base station may discard the UL tDAI value after the HARQ codebook is received in the first repetition of the UL grant.

In another example, a PUCCH carrying one or more HARQ feedback bits of the at least one DL grant may overlap with a PUSCH of one of the at least one repetition of the UL grant.

Figure 15:
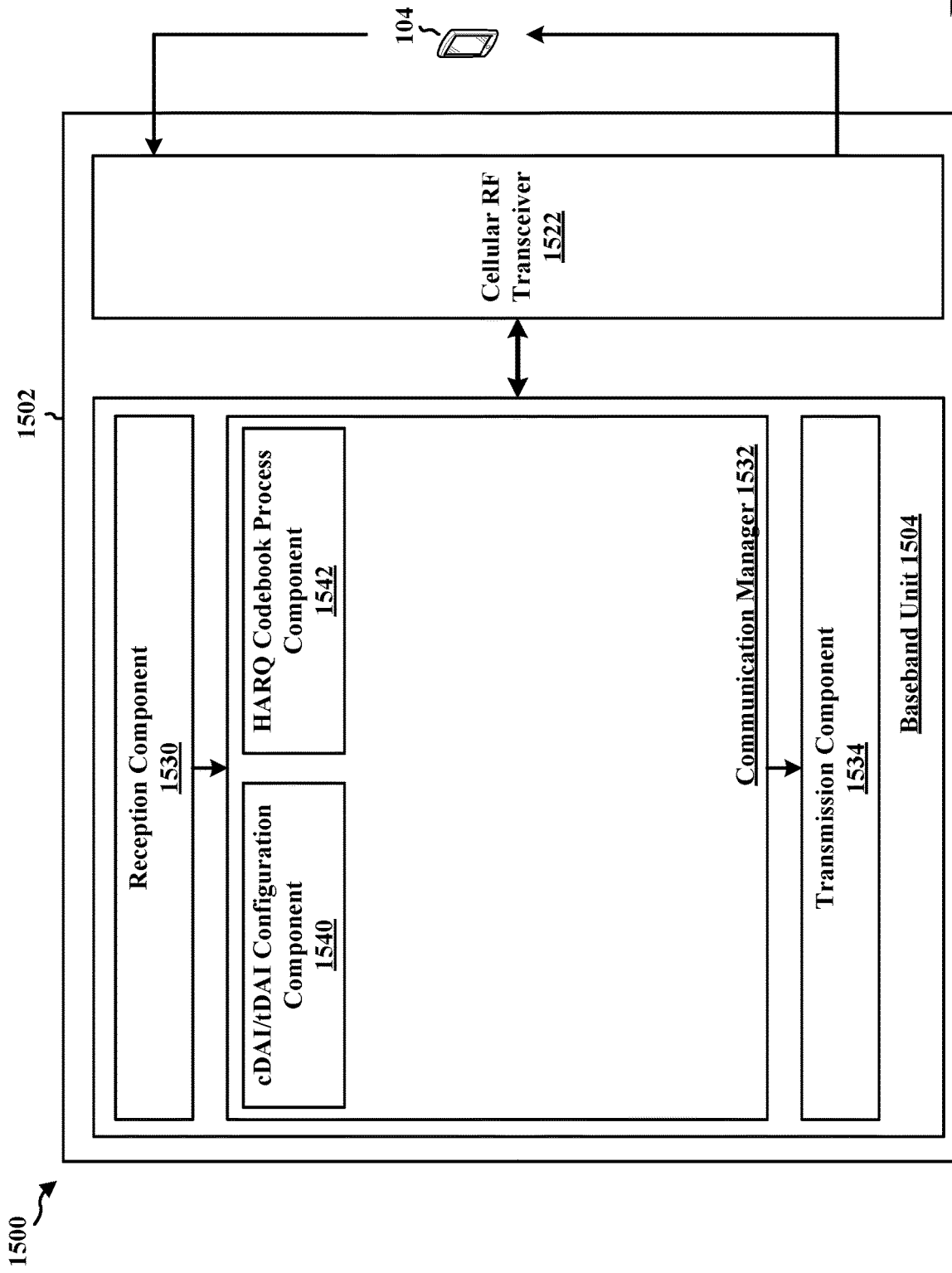
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a cDAI/tDAI configuration component 1540 that transmits one or more DL grants prior to the transmission of the UL grant, where the one or more DL grants may be associated with a DL cDAI, e.g., as described in connection with 1402 of FIG. 14, and/or transmits, to a UE, at least one DL grant after a transmission of an UL grant, where the at least one DL grant is associated with a DL cDAI value and a DL tDAI value, and the UL grant is associated with an UL tDAI value and scheduling a plurality of PUSCH repetitions, e.g., as described in connection with 1404 of FIG. 14. The communication manager 1532 further includes a HARQ codebook process component 1542 that receives, from the UE, a HARQ codebook in at least one of the plurality of PUSCH repetitions, where a size of the HARQ codebook is based at least on the UL tDAI value, e.g., as described in connection with 1406 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting one or more DL grants prior to the transmission of the UL grant, where the one or more DL grants may be associated with a DL cDAI (e.g., the cDAI/tDAI configuration component 1540 and/or the transmission component 1534). The apparatus 1402 includes means for transmitting, to a UE, at least one DL grant after a transmission of an UL grant, where the at least one DL grant may be associated with a DL cDAI value and a DL tDAI value, and the UL grant may be associated with an UL tDAI value and scheduling a plurality of PUSCH repetitions (e.g., the cDAI/tDAI configuration component 1540 and/or the transmission component 1534). The apparatus 1402 includes means for receiving, from the UE, a HARQ codebook in at least one of the plurality of PUSCH repetitions, a size of the HARQ codebook being based at least on the UL tDAI value (e.g., the HARQ codebook process component 1542 and/or the reception component 1530).

In one configuration, the DL cDAI associated with the one or more DL grants may be different from the DL cDAI associated with the at least one DL grant. In such a configuration, the DL cDAI associated with the one or more DL grants may be reset prior to the transmission of the at least one DL grant.

In another configuration, the apparatus 1402 includes means for incrementing the tDAI value associated with the at least one DL grant per previous DL grant.

In another configuration, the apparatus 1402 includes means for incrementing tDAI value and the cDAI value associated with the at least one DL grant using the UL tDAI value as a reference.

In another configuration, the apparatus 1402 includes means for transmitting, to the UE, at least one repetition of the UL grant. In such a configuration, the HARQ codebook may be associated with the at least one repetition of the UL grant. In such a configuration, the HARQ codebook may be associated with a first repetition of the UL grant. In such a configuration, the apparatus 1402 includes means for discarding the UL tDAI value after the HARQ codebook is received in the first repetition of the UL grant.

In another configuration, a PUCCH carrying one or more HARQ feedback bits of the at least one DL grant may overlap with a PUSCH of one of the at least one repetition of the UL grant.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive at least one DL grant after a reception of an UL grant, the at least one DL grant being associated with a DL cDAI value and a DL tDAI value, the UL grant being associated with an UL tDAI value and scheduling a plurality of PUSCH repetitions; calculate a total number of DL grants sent to the UE based on the DL cDAI value; adjust the total number of DL grants if there is a difference between the total number of DL grants and the UL tDAI value; and transmit a HARQ codebook in at least one of the plurality of PUSCH repetitions, a size of the HARQ codebook being based on the adjusted total number of DL grants.

Aspect 2 is the apparatus of aspect 1, further including a transceiver coupled to the at least one processor.

Aspect 3 is the apparatus of any of aspects 1 and 2, where the at least one processor is further configured to: receive one or more DL grants prior to the reception of the UL grant, wherein the one or more DL grants are associated with a DL cDAI; determine whether there is a difference between the UL tDAI value and the total number of DL grants sent to the UE until a reception of the one or more DL grants; and adjust the total number of DL grants received until the reception of the one or more DL grants if there is the difference between the UL tDAI value and the total number of DL grants received until the reception of the one or more DL grants.

Aspect 4 is the apparatus of any of aspects 1 to 3, where the DL cDAI associated with the one or more DL grants is different from the DL cDAI associated with the at least one DL grant.

Aspect 5 is the apparatus of any of aspects 1 to 4, where to adjust the total number of DL grants if there is the difference between the total number of DL grants and the UL tDAI value, the at least one processor is further configured to: add one or more counts to the total number of DL grants.

Aspect 6 is the apparatus of any of aspects 1 to 5, where the at least one processor is further configured to: add one or more padding bits or dummy bits to the HARQ codebook based on the one or more counts added to the total number of DL grants.

Aspect 7 is the apparatus of any of aspects 1 to 6, where the at least one DL grant is at least one PDSCH grant and the UL grant is a PUSCH grant.

Aspect 8 is the apparatus of any of aspects 1 to 7, where the at least one processor is further configured to: receive at least one repetition of the UL grant.

Aspect 9 is the apparatus of any of aspects 1 to 8, where the HARQ codebook is multiplexed with one PUSCH repetition.

Aspect 10 is the apparatus of any of aspects 1 to 9, where the HARQ codebook is excluded from multiplexing with a first PUSCH repetition.

Aspect 11 is the apparatus of any of aspects 1 to 10, where the at least one processor is further configured to: determine the size of the HARQ codebook for one or more repetitions of the UL grant subsequent to the first PUSCH repetition based on the DL tDAI value.

Aspect 12 is the apparatus of any of aspects 1 to 11, where the at least one processor determines the size of the HARQ codebook for the one or more repetitions of the UL grant subsequent to the first PUSCH repetition without the UL tDAI value.

Aspect 13 is the apparatus of any of aspects 1 to 12, where the at least one processor is further configured to: discard the UL tDAI value after the size of the HARQ codebook is determined or after the HARQ codebook is multiplexed with the first PUSCH repetition of the UL grant.

Aspect 14 is the apparatus of any of aspects 1 to 13, where a PUCCH carrying one or more HARQ feedback bits of the at least one DL grant overlaps with a PUSCH of one of the at least one repetition of the UL grant.

Aspect 15 is the apparatus of any of aspects 1 to 14, where the HARQ codebook corresponds to a HARQ ACK/NACK codebook.

Aspect 16 is the apparatus of any of aspects 1 to 15, where the at least one processor is configured to determine whether there is the difference between the total number of DL grants sent to the UE and the UL tDAI value of the UL grant prior to determining the size of the HARQ codebook.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication including at least one processor coupled to a memory and configured to transmit at least one DL grant for a UE after a transmission of an UL grant, the at least one DL grant being associated with a DL cDAI value and a DL tDAI value, the UL grant being associated with an UL tDAI value and scheduling a plurality of PUSCH repetitions; and receive a HARQ codebook in at least one of the plurality of PUSCH repetitions, a size of the HARQ codebook being based at least on the UL tDAI value.

Aspect 21 is the apparatus of aspect 20, further including a transceiver coupled to the at least one processor.

Aspect 22 is the apparatus of any of aspects 20 and 21, where the at least one processor is further configured to: transmit one or more DL grants prior to the transmission of the UL grant, where the one or more DL grants are associated with a DL cDAI.

Aspect 23 is the apparatus of any of aspects 20 to 22, where the DL cDAI associated with the one or more DL grants is different from the DL cDAI associated with the at least one DL grant.

Aspect 24 is the apparatus of any of aspects 20 to 23, where the DL cDAI associated with the one or more DL grants is being reset prior to the transmission of the at least one DL grant.

Aspect 25 is the apparatus of any of aspects 20 to 24, where the at least one DL grant is at least one PDSCH grant and the UL grant is a PUSCH grant.

Aspect 26 is the apparatus of any of aspects 20 to 25, where the at least one processor is further configured to: transmit at least one repetition of the UL grant.

Aspect 27 is the apparatus of any of aspects 20 to 26, where the HARQ codebook is associated with the at least one repetition of the UL grant.

Aspect 28 is the apparatus of any of aspects 20 to 27, where the HARQ codebook is associated with a first repetition of the UL grant.

Aspect 29 is the apparatus of any of aspects 20 to 28, where the at least one processor is further configured to: discard the UL tDAI value after the HARQ codebook is received in the first repetition of the UL grant.

Aspect 30 is the apparatus of any of aspects 20 to 29, where a PUCCH carrying one or more HARQ feedback bits of the at least one DL grant overlaps with a PUSCH of one of the at least one repetition of the UL grant.

Aspect 31 is the apparatus of any of aspects 20 to 30, where the HARQ codebook corresponds to a HARQ ACK/NACK codebook.

Aspect 32 is the apparatus of any of aspects 20 to 31, where the at least one processor is further configured to: increment the tDAI value associated with the at least one DL grant per previous DL grant.

Aspect 33 is the apparatus of any of aspects 20 to 32, where the at least one processor is further configured to: increment tDAI value and the cDAI value associated with the at least one DL grant using the UL tDAI value as a reference.

Aspect 34 is a method of wireless communication for implementing any of aspects 20 to 33.

Aspect 35 is an apparatus for wireless communication including means for implementing any of aspects 20 to 33.

Aspect 36 is a computer-readable medium storing computer executable code, where the code when executed by a processor causes the processor to implement any of aspects 20 to 33.

What is claimed is:

1. An apparatus for wireless communication at a user equipment (UE), comprising:
at least one memory; and
at least one processor coupled to the at least one memory and configured to:
receive at least one downlink (DL) grant after a reception of an uplink (UL) grant, the at least one DL grant being associated with a DL current downlink assignment index (cDAI) value and a DL total downlink assignment index (tDAI) value, the DL cDAI value being a counter value, the UL grant being associated with an UL tDAI value and scheduling a plurality of physical uplink shared channel (PUSCH) repetitions;
calculate a total number of DL grants sent to the UE based on the DL cDAI value;
adjust the total number of DL grants if there is a difference between the total number of DL grants and the UL tDAI value; and
transmit a hybrid automatic repeat request (HARQ) codebook associated with the at least one DL grant in at least one of the plurality of PUSCH repetitions, a size of the HARQ codebook being based on the adjusted total number of DL grants.

2. The apparatus of claim 1, wherein to calculate the total number of DL grants sent to the UE based on the DL cDAI value and to adjust the total number of DL grants if there is the difference between the total number of DL grants and the UL tDAI value, the at least one processor is configured to:
determine whether there is the difference between the total number of DL grants sent to the UE and the UL tDAI value of the UL grant; and
insert one or more dummy bits to a set of HARQ bits if there is the difference between the total number of DL grants and the UL tDAI value.

3. The apparatus of claim 1, wherein the at least one processor is further configured to:
receive one or more DL grants prior to the reception of the UL grant, wherein the one or more DL grants are associated with a DL cDAI;
determine whether there is a difference between the UL tDAI value and the total number of DL grants sent to the UE until a reception of the one or more DL grants; and
adjust the total number of DL grants received until the reception of the one or more DL grants if there is the difference between the UL tDAI value and the total number of DL grants received until the reception of the one or more DL grants.

4. The apparatus of claim 3, wherein the DL cDAI associated with the one or more DL grants is different from the DL cDAI associated with the at least one DL grant.

5. The apparatus of claim 1, wherein to adjust the total number of DL grants if there is the difference between the total number of DL grants and the UL tDAI value, the at least one processor is further configured to:
add one or more counts to the total number of DL grants.

6. The apparatus of claim 5, wherein the at least one processor is further configured to:
add one or more padding bits or dummy bits to the HARQ codebook based on the one or more counts added to the total number of DL grants.

7. The apparatus of claim 1, wherein the at least one DL grant is at least one physical downlink shared channel (PDSCH) grant and the UL grant is a PUSCH grant.

8. The apparatus of claim 1, wherein the at least one processor is further configured to:
receive at least one repetition of the UL grant.

9. The apparatus of claim 1, wherein the HARQ codebook is multiplexed with one PUSCH repetition.

10. The apparatus of claim 1, wherein the HARQ codebook is excluded from multiplexing with a first PUSCH repetition.

11. The apparatus of claim 10, wherein the at least one processor is further configured to:
determine the size of the HARQ codebook for one or more repetitions of the UL grant subsequent to the first PUSCH repetition based on the DL tDAI value.

12. The apparatus of claim 11, wherein the at least one processor determines the size of the HARQ codebook for the one or more repetitions of the UL grant subsequent to the first PUSCH repetition without the UL tDAI value.

13. The apparatus of claim 10, wherein the at least one processor is further configured to:
discard the UL tDAI value after the size of the HARQ codebook is determined or after the HARQ codebook is multiplexed with the first PUSCH repetition of the UL grant.

14. The apparatus of claim 8, wherein a physical uplink control channel (PUCCH) carrying one or more HARQ feedback bits of the at least one DL grant overlaps with a PUSCH of one of the at least one repetition of the UL grant.

15. The apparatus of claim 1, wherein the HARQ codebook corresponds to a HARQ acknowledgement (ACK)/negative-ACK (NACK) codebook.

16. The apparatus of claim 1, wherein the at least one processor is configured to determine whether there is the difference between the total number of DL grants sent to the UE and the UL tDAI value of the UL grant prior to determining the size of the HARQ codebook.

17. A method of wireless communication at a user equipment (UE), comprising:
receiving at least one downlink (DL) grant after a reception of an uplink (UL) grant, the at least one DL grant being associated with a DL current downlink assignment index (cDAI) value and a DL total downlink assignment index (tDAI) value, the DL cDAI value being a counter value, the UL grant being associated with an UL tDAI value and scheduling a plurality of physical uplink shared channel (PUSCH) repetitions;
calculating a total number of DL grants sent to the UE based on the DL cDAI value;
adjusting the total number of DL grants if there is a difference between the total number of DL grants and the UL tDAI value; and
transmitting a hybrid automatic repeat request (HARQ) codebook associated with the at least one DL grant in at least one of the plurality of PUSCH repetitions, a size of the HARQ codebook being based on the adjusted total number of DL grants.

18. The method of claim 17, wherein calculating the total number of DL grants sent to the UE based on the DL cDAI value and adjusting the total number of DL grants if there is the difference between the total number of DL grants and the UL tDAI value comprises:
determining whether there is the difference between the total number of DL grants sent to the UE and the UL tDAI value of the UL grant; and inserting one or more dummy bits to a set of HARQ bits if there is the difference between the total number of DL grants and the UL tDAI value.

19. An apparatus for wireless communication at a network entity, comprising:
at least one memory; and
at least one processor coupled to the at least one memory and configured to:
transmit at least one downlink (DL) grant for a user equipment (UE) after a transmission of an uplink (UL) grant, the at least one DL grant being associated with a DL current downlink assignment index (cDAI) value and a DL total downlink assignment index (tDAI) value, the DL cDAI value being a counter value, the UL grant being associated with an UL tDAI value and scheduling a plurality of physical uplink shared channel (PUSCH) repetitions; and
receive a hybrid automatic repeat request (HARQ) codebook associated with the at least one DL grant in at least one of the plurality of PUSCH repetitions, a size of the HARQ codebook being based at least on the UL tDAI value.

20. The apparatus of claim 19, wherein the at least one processor is further configured to:
transmit one or more DL grants prior to the transmission of the UL grant, wherein the one or more DL grants are associated with a DL cDAI.

21. The apparatus of claim 20, wherein the DL cDAI associated with the one or more DL grants is different from the DL cDAI associated with the at least one DL grant.

22. The apparatus of claim 20, wherein the DL cDAI associated with the one or more DL grants is being reset prior to the transmission of the at least one DL grant.

23. The apparatus of claim 19, wherein the at least one DL grant is at least one physical downlink shared channel (PDSCH) grant and the UL grant is a physical uplink shared channel (PUSCH) grant.

24. The apparatus of claim 19, wherein the at least one processor is further configured to:
transmit at least one repetition of the UL grant.

25. The apparatus of claim 24, wherein the HARQ codebook is associated with the at least one repetition of the UL grant.

26. The apparatus of claim 24, wherein the HARQ codebook is associated with a first repetition of the UL grant.

27. The apparatus of claim 26, wherein the at least one processor is further configured to:
discard the UL tDAI value after reception of the HARQ codebook in the first repetition of the UL grant.

28. The apparatus of claim 24, wherein a physical uplink control channel (PUCCH) carrying one or more HARQ feedback bits of the at least one DL grant overlaps with a PUSCH of one of the at least one repetition of the UL grant.

29. The apparatus of claim 19, wherein the at least one processor is further configured to:
increment the tDAI value associated with the at least one DL grant per previous DL grant.

30. The apparatus of claim 19, wherein the at least one processor is further configured to:
increment tDAI value and the cDAI value associated with the at least one DL grant using the UL tDAI value as a reference.

31. A method of wireless communication at a network entity, comprising:
transmitting at least one downlink (DL) grant for a user equipment (UE) after a transmission of an uplink (UL) grant, the at least one DL grant being associated with a DL current downlink assignment index (cDAI) value and a DL total downlink assignment index (tDAI) value, the DL cDAI value being a counter value, the UL grant being associated with an UL tDAI value and scheduling a plurality of physical uplink shared channel (PUSCH) repetitions; and
receiving a hybrid automatic repeat request (HARQ) codebook associated with the at least one DL grant in at least one of the plurality of PUSCH repetitions, a size of the HARQ codebook being based at least on the UL tDAI value.

* * * * *